(12) United States Patent
Srinivas et al.

(10) Patent No.: US 7,060,233 B1
(45) Date of Patent: Jun. 13, 2006

(54) PROCESS FOR THE SIMULTANEOUS REMOVAL OF SULFUR AND MERCURY

(75) Inventors: Girish Srinivas, Broomfield, CO (US); Robert J. Copeland, Golden, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 10/717,299

(22) Filed: Nov. 19, 2003

Related U.S. Application Data

(63) Continuation-in-part of application No. 10/358,404, filed on Feb. 3, 2003.

(60) Provisional application No. 60/427,742, filed on Nov. 19, 2002, provisional application No. 60/420,694, filed on Oct. 22, 2002, provisional application No. 60/388,322, filed on Jun. 13, 2002, provisional application No. 60/367,891, filed on Mar. 25, 2002.

(51) Int. Cl.
*B01D 53/64* (2006.01)
*B01D 53/48* (2006.01)
*B01D 53/52* (2006.01)
*C01B 17/04* (2006.01)
*C01G 13/00* (2006.01)

(52) U.S. Cl. ............... 423/210; 423/230; 423/244.01; 423/244.02; 423/244.09; 423/244.1; 423/566.1; 423/573.1; 423/574.1; 423/576; 423/576.2; 423/576.8

(58) Field of Classification Search ............... 423/230, 423/244.01, 244.02, 244.09, 244.1, 539, 423/542, 573.1, 574.1, 576, 576.8, 566.1, 423/576.2, 110, 210
See application file for complete search history.

(56) References Cited

U.S. PATENT DOCUMENTS

| | | | |
|---|---|---|---|
| 3,880,986 A | 4/1975 | Beavon | 423/574 |
| 4,002,720 A * | 1/1977 | Wheelock et al. | 423/230 |
| 4,012,486 A * | 3/1977 | Singleton | 423/224 |
| 4,044,098 A | 8/1977 | Miller et al. | 423/210 |
| 4,088,743 A * | 5/1978 | Hass et al. | 423/539 |
| 4,169,136 A * | 9/1979 | Hass et al. | 423/539 |
| 4,196,101 A * | 4/1980 | Wilson et al. | 502/221 |
| 4,197,277 A * | 4/1980 | Sugier et al. | 423/231 |
| 4,206,183 A * | 6/1980 | Yamada et al. | 423/210 |
| 4,243,647 A | 1/1981 | Hass et al. | 423/573 |
| 4,246,141 A * | 1/1981 | Hass et al. | 502/78 |
| 4,279,882 A | 7/1981 | Beavon | 423/574 R |
| 4,311,683 A | 1/1982 | Hass et al. | 423/573 |
| 4,314,983 A | 2/1982 | Hass et al. | 423/542 |
| 4,406,873 A | 9/1983 | Beavon | 423/574 R |
| 4,427,576 A * | 1/1984 | Dupin | 502/218 |
| 4,439,412 A | 3/1984 | Behie et al. | 423/573 G |
| 4,444,741 A | 4/1984 | Hass et al. | 423/542 |
| 4,444,742 A | 4/1984 | Hass et al. | 423/573 |
| 4,444,908 A | 4/1984 | Hass et al. | 502/247 |
| 4,508,699 A | 4/1985 | Schoofs | 423/574 R |
| 4,519,992 A | 5/1985 | Alkhazov et al. | 423/230 |
| 4,528,277 A | 7/1985 | Hass et al. | 502/79 |
| 4,552,746 A | 11/1985 | Kettner et al. | 423/573 |
| 4,623,533 A | 11/1986 | Broecker et al. | 423/573 |
| 4,640,908 A | 2/1987 | Dupin | 502/243 |
| 4,786,483 A * | 11/1988 | Audeh | 423/210 |
| 4,818,740 A | 4/1989 | Berben et al. | 502/313 |
| 4,857,297 A | 8/1989 | Kettner et al. | 423/576.8 |
| 4,886,649 A | 12/1989 | Ismagilov et al. | 423/230 |
| 4,937,058 A * | 6/1990 | Dupin et al. | 423/224 |
| 4,981,577 A * | 1/1991 | Audeh et al. | 208/251 R |
| 4,982,003 A * | 1/1991 | Hara et al. | 564/480 |
| 4,983,277 A * | 1/1991 | Audeh et al. | 208/252 |
| 5,034,203 A | 7/1991 | Audeh et al. | 423/210 |
| 5,037,629 A | 8/1991 | Berben et al. | 423/576.8 |
| 5,053,209 A | 10/1991 | Yan | 423/210 |
| 5,130,108 A * | 7/1992 | Audeh et al. | 423/210 |
| 5,176,896 A * | 1/1993 | Bela | 423/574.1 |
| 5,209,913 A * | 5/1993 | Audeh et al. | 423/210 |
| 5,256,384 A | 10/1993 | Rolke et al. | 423/220 |
| 5,286,697 A | 2/1994 | van den Brink et al. | 502/257 |
| 5,352,422 A | 10/1994 | van den Brink et al. | 423/224 |
| 5,397,556 A | 3/1995 | Towler et al. | 423/220 |
| 5,466,427 A * | 11/1995 | Rumpf et al. | 423/210 |
| 5,474,670 A | 12/1995 | Daage et al. | 208/210 |
| 5,480,636 A * | 1/1996 | Maruo et al. | 424/76.21 |
| 5,512,258 A * | 4/1996 | Bouyanov et al. | 423/230 |
| 5,512,260 A | 4/1996 | Kiliany et al. | 423/242.1 |

(Continued)

FOREIGN PATENT DOCUMENTS

| | | |
|---|---|---|
| EP | 0 215 317 | 8/1986 |
| FR | 2702674 | 3/1993 |
| GB | 2143225 A | 2/1985 |

OTHER PUBLICATIONS

Alcoa (1997) "Look at Claus Unit Design," Alcoa Technical Bulletin 6030-R010797.

(Continued)

*Primary Examiner*—Stanley S. Silverman
*Assistant Examiner*—Ardith E. Hertzog
(74) *Attorney, Agent, or Firm*—Greenlee, Winner and Sullivan, P.C.

(57) ABSTRACT

A process for removing hydrogen sulfide, other sulfur-containing compounds and/or sulfur and mercury from a gas stream contaminated with mercury, hydrogen sulfide or both. The method comprises the step of selective oxidation of hydrogen sulfide ($H_2S$) in a gas stream containing one or more oxidizable components other than $H_2S$ to generate elemental sulfur (S) or a mixture of sulfur and sulfur dioxide ($SO_2$). The sulfur generated in the gas stream reacts with mercury in the gas stream to generate mercuric sulfide and sulfur and mercuric sulfide are removed from the gas stream by co-condensation.

53 Claims, 9 Drawing Sheets

U.S. PATENT DOCUMENTS

| | | | |
|---|---|---|---|
| 5,543,036 A * | 8/1996 | Chang et al. | 208/189 |
| 5,547,649 A | 8/1996 | Beck et al. | 423/230 |
| 5,597,546 A | 1/1997 | Li et al. | 423/573.1 |
| 5,607,496 A | 3/1997 | Brooks | 75/670 |
| 5,607,657 A | 3/1997 | Phillippe et al. | 423/576.2 |
| 5,653,953 A | 8/1997 | Li et al. | 423/576.8 |
| 5,733,516 A | 3/1998 | DeBerry | 423/220 |
| 5,738,834 A | 4/1998 | Deberry | 422/177 |
| 5,827,352 A | 10/1998 | Altman et al. | 95/58 |
| 5,900,042 A | 5/1999 | Mendelsohn et al. | 75/742 |
| 6,083,473 A | 7/2000 | Esquivel et al. | 423/576.8 |
| 6,099,819 A | 8/2000 | Srinivas et al. | 423/573.1 |
| 6,207,127 B1 | 3/2001 | Geus et al. | 423/573.1 |
| 6,214,304 B1 | 4/2001 | Rosenthal et al. | 423/210 |
| 6,248,217 B1 | 6/2001 | Biswas et al. | 204/157.4 |
| 6,251,359 B1 | 6/2001 | Li et al. | 423/573.1 |
| 6,299,851 B1 | 10/2001 | Li et al. | 423/573.1 |
| 6,416,729 B1 | 7/2002 | DeBerry et al. | 423/573.1 |
| 6,521,021 B1 | 2/2003 | Pennline et al. | 95/134 |
| 6,576,092 B1 | 6/2003 | Granite et al. | 204/158.2 |
| 6,579,510 B1 * | 6/2003 | Keller et al. | 423/573.1 |
| 6,589,318 B1 | 7/2003 | El-Shoubary et al. | 96/108 |
| 6,610,263 B1 | 8/2003 | Pahlman et al. | 423/239.1 |
| 2003/0194366 A1 | 10/2003 | Srinivas et al. | 423/230 |

OTHER PUBLICATIONS

Alkhazov, T.G. et al. (Feb. 1991), "Oxidation of Hydrogen Sulfide on a Multicomponent Iron-Containing Catalyst," J. Appl. Chem. USSR 64(2):1, 238.

Butt, J.B. and Petersen, E.E. (1988) *Activation, Deactivation and Poisoning of Catalysts*, Academic Press, p. 83.

Chowdhury, A.I. and Tollefson E.L. (1990), "Catalyst Modification and Process Design Considerations for the Oxidation of Low Concentrations of Hydrogen Sulfide in Natural Gas," Can. J. Chem. Eng. 68:449-454.

Cline, C. et al., (Feb. 2003), "Biological Process for $H_2S$ Removal from Gas Streams: The Shell-Paques/Thiopaq Gas Desulfurization Process," Proceedings of the 52$^{nd}$ Laurance Reid Gas Conditioning Conference, held Feb. 2002.

Crevier, P. P., Dowling, N.I., Clark, P.D. and Huang, M. (2001) "Quantifying the Effect of Individual Aromatic Contaminants on Claus Catalyst," *Proceedings, 51$^{st}$ Annual Laurance Reid Gas Conditioning Conference*, University of Oklahoma, Feb. 2001.

Dalai, A.K. et al. (1993), "The Effects of Pressure and Temperature on the Catalytic Oxidation of Hydrogen Sulfide in natural Gas and Regeneration of The Catalyst to Recover the Sulfur Produced," Can. J. Chem. Eng. 71:75-82.

Fenderson, S. (1988), "Improving Claus Sulfur Recovery Unit Reliability through Engineering Design," *Brimstone Engineering Sulfur Recovery Symposium*, Sep. 15-18, 1998.

Fisher, K.S., J.E. Lundeen, D. Leppin (1999) "Fundamentals of $H_2S$ Scavenging for Treatment of Natural Gas," *Ninth GRI Sulfur Recovery Conference* Oct. 24-27, 1999, San Antonio TX.

"Gas Processes 2002" in *Hydrocarbon Processing*, May 2002, pp. 107-121.

Ghosh, T.K. and Tollefson, E.L. (1986), "A Continuous Process for Recovery of Sulfur from Natural Gas Containing Low Concentrations of Hydrogen Sulfide," Can J. Chem. Eng. 64:960-968.

Goar, B.G. et al. (1992), "Superclaus: performance worldwide," Sulphur, No. 22:44-47.

Goar, B,G. and Sames, J.A., (1983). "Tail Gas Clean-up Processes—A Review," *Proceedings: Gas Conditioning Conference* Mar. 1983, p. E-13.

Granite, E.J; Pennline, H.W; and Hargis, R.A. (Apr. 2000) Industrial Engineering Chem. Res. 39:1020-1029.

Hardison, L.C. and Ramshaw, D.E. "$H_2S$ to S: Process Improvements," *Hydrocarbon Processsing*, vol. 71, Jan. 1992, pp. 89-90.

Hutchings, G.J. (1992) "Catalysis and Environment," Applied Catalysis A: General 84(2):2 pp.

Khanmamedov, T.K. et al. (1988), "Study of the Active Surface of Titanium Oxide Catalysts for the Oxidation of Hydrogen Sulfide," Kinetika i Kataliz 29(4):999-1002 (English translation).

Kohl, A. and Nielsen, R. (1997) *Gas Purification*, 5$^{th}$ ed., Gulf Publishing Company, pp. 40-62; 670-688; 805-823.

Livengood, C.D. (Jul. 1998), "Investigation of Modified Speciation for Enhanced Control of Mercury," Advanced Coal-Based Power and Environmental Systems '98 Conference, Morgantow, West Virginia, 11 pp.

Marshneva, V.I., and V.V. Mokrinskii (1989). "Catalytic Activity of Metal Oxides in Hydrogen Sulfide Oxidation by Oxygen and Sulfur Dioxide," *Kinetics and Catalysis*, 29(4), pp. 989-993.

McIntush, K.E.; Petrinec, B.J.; Beitler, C.A.M. (2000) "Results of Pilot Testing the CrystaSulf™ Process," *Proceedings of the 50$^{th}$ Laurance Reid Gas Conditioning Conference*, Feb. 27-Mar. 1, 2000, Norman OK.

McIntush, K.E. C.O. Rueter and K.E. De Berry (2001) "Comparison of Technologies for Removing Sulfure for High-Pressure Sour Natural Gas with Sulfur Throughputs between ). 1 and 30 Long Tons/Day," *Proc. 80Annual GPA Convention*.

Nagl, G.J. (1991) "The State of Liquid Redox" Proceedings of the Ninth Gas Research Institute Sulfur Recovery Conference, Gas Research Institute Chicago, IL.

Nagl, G.J. (2001) "Employing Liquid Redox as a tail Gas Cleanup Unit" 2001 NPRA Environmental Conference Sep. 23-25, 2001, Austin TX, National Petrochemical and Refiners Association, Washington, D.C.

Novak, M. and Zdrazil, M. (1991) "Oxidation of Hydrogen Sulfide over $Fe_2O_3/Al_2O_3$ Catalyst: Influence of Support Texture and $Fe_2O_3$ Precursor" *Collection of Czechoslovak Chemical Communication* Sep. 1, v 56 n 9, p. 1893.

Olah, G.A. and Molnar, A. (1995) *Hydrocarbon Chemistry*, Wiley, pp. 535-541.

Oostwouder, S.P. (1997) "SulFerox Process Update," *Proc. GRI Sulfur Recovery Conf. 8$^{th}$ Meeting*, 1997.

Pacific Environmental Services (1996) Background Report AP-42 Section 5.18 "Sulfur Recovery" Prepared for the United States Environmental Agency OAQPS/TSD/EIB available from the US EPA (Pacific Environmental Services, Inc. P.O. Box 12077 Research Triangle Park, NC 27709).

Satterfield, C.N. (1991) *Heterogeneous Catalysis in Industrial Practice*, 2$^{nd}$ ed., McGraw-Hill.

Smit, C.J. and E.C. Heyman (1999) "Present Status SulFerox Process." *Proc. GRI Sulfur Recovery Conf. 9$^{th}$ Meeting*, 1999.

Stocchi, E. (1990) *Industrial Chemistry*, Ellis Norwood, p. 203.

United States Department of Energy, National Energy Technology Laboratory, (Feb. 2002) "Selective Catalytic Oxidation of Hydrogen Sulfide for Simultaneous Coal Gas Desulfurization and Direct Sulfur Production (SCOHS)," Contract No. DE-AM36-99FT40465, 36pp.

US 4,432,961, 02/1984, Hass et al. (withdrawn)

* cited by examiner

PROCESS FOR THE SIMULTANEOUS REMOVAL OF SULFUR AND MERCURY

CROSS-REFERENCE TO RELATED APPLICATIONS

This application, which claims the benefit of U.S. Provisional Application 60/427,742, filed Nov. 19, 2002, is a continuation-in-part of pending U.S. application Ser. No. 10/358,404, filed Feb. 3, 2003 which in turn claims the benefit of U.S. Provisional Application 60/367,891, filed Mar. 25, 2002; U.S. Provisional Application 60/388,322, filed Jun. 13, 2002; and U.S. Provisional Application 60/420,694, filed October 22, 2002. Each of these applications is incorporated by reference herein in its entirety.

BACKGROUND OF THE INVENTION

The implementation of stricter emission limits for hydrogen sulfide ($H_2S$) and sulfur dioxide ($SO_2$) has stimulated the development and improvement of processes for the desulfurization of natural gas, synthesis gas, gasification streams and other gas streams used or generated in petroleum processing, oil recovery and coal utilization. For example, the level of $H_2S$ in natural gas must be lowered to 4 ppmv to meet pipeline specifications. Sulfur removal or desulfurization processes can also be applied to offgas generated in digesters or in waste water treatment, or to geothermal gases Desulfurization is often required for applications other than natural gas, including purification of gasification streams, associated gas from wells, and various gas streams generated in petroleum refining.

Hydrogen and CO are the products of the gasification of coal, hydrocarbons, biomass, solid waste and other feedstocks. Gasification is most generally any process where carbon-containing materials are converted into product gases containing primarily carbon monoxide (CO) and hydrogen ($H_2$). Various gasification processes are known and practiced in the art.

The product gas generated by gasification can be used to generate electricity or steam or can be used in chemical synthesis to make methyl alcohol (methanol), higher alcohols, aldehydes, or synthetic fuels (via Fischer Tropsch catalysis). Because one of the uses of gasifier product gas is to make chemicals, it is frequently referred to as synthesis gas or syngas (Satterfield, C. N. (1991) *Heterogeneous Catalysis in Industrial Practice*, $2^{nd}$ ed., McGraw-Hill.) In most gasification processes, sulfur compounds present in the feedstock are converted into hydrogen sulfide, which appears in the product gas. Hydrogen sulfide must be removed from the CO and $H_2$ mixture before the gas can be used for power generation because burning it generates sulfur dioxide emissions from the power plant. Hydrogen sulfide must be removed from the CO and $H_2$ used for chemical synthesis because $H_2S$ irreversibly damages the catalysts used to make alcohols, aldehydes, and other products.

Mercury can be a significant contaminant in gas streams derived from fossil fuels such as coal (e.g., by gasification) and in natural gas. Mercury can also be a significant contaminant in flue gas emitted from coal-fired power plants. Mercury is removed from such gas streams to minimize its undesirable environmental release and to minimize the potentially detrimental effects that it may have on gas stream processing equipment. The levels of mercury present in any gas stream can vary widely dependent upon the type or gas stream and its origin.

Various methods have been reported in the art for the removal of mercury from gas streams, including injection or spraying of dry sorbents (e.g., activated carbon sorbents) or adsorbents, chemisorption methods (e.g., using chemically promoted sorbents), and scrubbing (e.g., with aqueous carbonate, sulfide or polysulfide solutions). The following U.S. patents or published PCT applications relate generally to removal of mercury from natural gas or synthesis gas (U.S. Pat. Nos. 5,034,203; and 5,053,209; and WO 94/22563) or to removal of mercury from combustion gases or flue gas (U.S. Pat. Nos. 6,214,304; 5,607,496; and 6,521,021). U.S. Pat. No. 6,589,318 relates to an adsorption powder for removing mercury from high temperature, high moisture gas streams.

Granite, E. J; Pennline, H. W; and Hargis, R. A. (April 2000) Industrial Engineering Chem. Res. 39:1020–1029 report the results of screening for sorbents capable of removing elemental mercury from various carrier gases. Sorbents screened included, among others, activated carbons, promoted activated carbons, certain metal oxides dispersed on supports (e.g., vanadium pentoxide and molybdenum oxide dispersed on a magnesium silicate support, manganese oxide or chromium-oxide supported on alumina and a ferric oxide sorbent); a platinum sorbent; a thiol promoted aluminosilicate sorbent and a molydenum sulfide sorbent. The reference also provides a brief overview of sorbent technology. U.S. Pat. No. 6,610,263 relates to methods and systems for removing certain pollutants from gas streams, such as combustion gases which employ sorbents or combinations of sorbents. Mercury is reported to be removed using an alumina sorbent. U.S. Pat. No. 5,827,352 relates to use of sorbent and water injection to remove mercury from gas streams.

U.S. Pat. No. 5,900,042 relates to a method to remove elemental mercury from a gas stream by first reacting the gas stream with an oxidizing solution to convert the elemental mercury to soluble mercury compounds and then passing the gas stream through a wet scrubber to remove the mercuric compounds and any oxidized constituents.

U.S. Pat. No. 6,248,217 relates to preventing release of heavy metals, such as mercury, using ultraviolet radiation to oxidize mercury, in exhaust gas, to its ionic forms which are less volatile. U.S. Pat. No. 6,576,092 also relates to removing elemental mercury from gas streams using UV irradiation.

U.S. Pat. No. 4,044,098 relates to a process for removal of mercury from gas streams using hydrogen sulfide and amines. The method is particularly applied to sulfur-free natural gas containing mercury. Hydrogen sulfide is added to the gas stream in excess of the stoichiometric amount needed to precipitate sulfides of mercury. Mercury is reported to precipitate out of the gas and the gas is then contacted with an amine to absorb hydrogen sulfide.

U.S. patent application Ser. No. 10/358,404, filed Feb. 3, 2003 and published as U.S. publication no. 2003 0194366A1 relates to catalysts and catalytic methods for the selective oxidation of hydrogen sulfide in a gas stream to generate elemental sulfur, sulfur dioxide or both. Employing the catalysts and methods therein, hydrogen sulfide can be selectively oxidized in the presence of other oxidizable species (including, aliphatic hydrocarbons, aromatic hydrocarbons, carbon dioxide, hydrogen or carbon monoxide) that may be present in the gas stream. The catalysts and methods therein are particularly applicable to the removal of hydrogen sulfide from gas streams, including natural gas, synthesis gas, and other gas streams generated or used in petroleum refining and processing. This application and its published counterpart are each incorporated by reference herein for teachings and descriptions of selective $H_2S$ oxidation catalysts, methods for selective oxidation of $H_2S$; catalytic reactors and catalytic reactor systems.

The present invention is based at least in part on the discovery that mercury in gas streams, such as natural gas and synthesis gas, can be removed or its levels significantly reduced by treatment employing certain selective oxidation processes described in U.S. publication no. 2003 0194366A1.

SUMMARY OF THE INVENTION

This invention relates to a process for removal of hydrogen sulfide, sulfur and mercury from gas streams, particularly natural gas streams and synthesis gas streams, containing mercury. Such gas streams typically contain undesired levels of hydrogen sulfide or other sulfur-containing compounds which can be converted to hydrogen sulfide. The process of this invention converts hydrogen sulfide in such gas streams at least in part to elemental sulfur which is condensed and removed from the gas stream. Elemental mercury present in such gas streams in which sulfur is generated is converted to mercuric sulfide in the presence of sulfur and also removed in the sulfur condenser. The process of the invention can be used for gas streams containing one part per billion to one part per million mercury. In an embodiment, the gas stream contains 10–30 ppb mercury. In different embodiments, the process of the invention permits greater than 85%, greater than 90%, greater than 95%, or greater than 99% removal of elemental mercury.

The process of the invention removes both sulfur and mercury in the sulfur condenser. Therefore, the separate mercury removal step typical of other gas treatment processes is eliminated.

In the process of this invention, selective oxidation of hydrogen sulfide ($H_2S$) in a gas stream generates sulfur or a mixture of sulfur and sulfur dioxide. Selective $H_2S$ oxidation applied to such gas streams can generate sulfur or a mixture of sulfur and sulfur dioxide without substantial oxidation of the one or more oxidizable components in the gas stream other than $H_2S$ and the methods can be used to remove mercury. The methods herein are useful, for example, for the selective oxidation of $H_2S$ to sulfur or sulfur and $SO_2$ in the presence of hydrocarbons, hydrocarbon oxygenate, sulfated hydrocarbons, aromatic hydrocarbons, aliphatic hydrocarbons, carbon dioxide, hydrogen or carbon monoxide and the removal of sulfur and mercury contaminants. The methods herein are particularly useful for the selective oxidation of $H_2S$ and mercury removal in gas streams containing natural gas (substantially methane), in gas streams containing one or more low molecular weight volatile hydrocarbons (methane, ethane, propane, butane, etc.), in gas streams containing one or more natural gas liquids (NGLs, e.g., pentanes (C5)-nonanes (C9)), in gas streams containing aromatic hydrocarbons, such as benzene, toluene, ethylbenzene and xylene (BTEX) and in gas streams, particularly synthesis gas streams, containing carbon monoxide and hydrogen.

Preferred methods of this invention are those that function in gas streams containing relatively high levels of light hydrocarbons, for example, in gas streams containing 50% or more by volume of methane or in methane rich gas containing 90% volume or more methane, without substantial oxidation of the hydrocarbon. Preferred methods of this invention function for desulfurization of, and mercury removal from, natural gas streams containing low molecular weight hydrocarbons other than methane (ethane, propanes, butanes, heptanes, hexanes, etc.) without substantial oxidation of the hydrocarbons. Preferred methods of this invention function for desulfurization and mercury removal in natural gas streams containing aromatic species, such as BTEX without substantial oxidation of the aromatic species.

In specific embodiments, in the methods of this invention a gas stream containing mercury, $H_2S$, and other oxidizable components is contacted with a mixed metal oxide oxidation catalyst at a temperature less than or equal to about 500° C. in the presence of a selected amount of oxygen to generate sulfur or a mixture of sulfur and $SO_2$ wherein less than about 25 mol % by volume of the oxidizable components other than $H_2S$ and other sulfur-containing compounds are oxidized by the oxygen. In preferred methods less than about 10 mol % by volume of the oxidizable compounds other than $H_2S$ and other sulfur-containing species are oxidized by the oxygen. In more preferred methods less than about 1 mol % volume of the oxidizable compounds other than $H_2S$ and other sulfur-containing species are oxidized by the oxygen. Gas streams may contain other sulfur-containing species which are either oxidized directly, or are first converted to $H_2S$ which is thereafter oxidized to generate sulfur or a combination of sulfur and $SO_2$. Sulfur-containing species that may be present in gas streams include, among others, $H_2S$, $SO_2$, $CS_2$, COS, and mercaptans.

Oxidation selectivity of the methods of this invention is at least in part controlled by use of temperatures less than or equal to about 500° C. Decreasing the temperature at which the catalytic oxidation of $H_2S$ occurs generally minimizes the oxidation of oxidizable components other than $H_2S$ and sulfur. The temperature of the reactor should, however, be maintained above the dew point of sulfur, for given process conditions, so that sulfur does not condense onto the catalyst or in the catalytic reactor system. The temperature should also be maintained sufficiently high to obtain good catalyst efficiency (measured as % conversion of $H_2S$ present). When condensable levels of sulfur are produced in the process, mercury (it is believed as mercuric sulfide) is removed during condensation of the sulfur.

Good catalyst efficiency means that 50% of more of the $H_2S$ is converted to sulfur or a combination of sulfur and $SO_2$. Preferably the catalyst and other conditions are selected to achieve 85% efficiency or more for conversion of $H_2S$ into sulfur or a combination of sulfur and $SO_2$. More preferably 95% or more efficiency of conversion of $H_2S$ is achieved and most preferably 99% or more efficiency of conversion is achieved. Preferred high efficiency catalysts also exhibit long lifetimes being resistant to catalyst deactivation in the presence of oxidizable species other than $H_2S$, to deactivation by other sulfur containing species or to water vapor. In specific embodiments the catalytic reaction is conducted at temperatures between about 100° C. and about 400° C. Improved selectivity of oxidation of $H_2S$ and at least good efficiency of conversion of $H_2S$ can be obtained when the temperature at which the catalytic reaction is conducted is below about 350° C. The reaction temperature is preferably maintained above about 160° C. for satisfactory catalytic activity. In preferred methods of this invention the catalytic reaction is conducted at temperatures ranging from about 160° C. to about 250° C. In more preferred methods of this invention the catalytic reaction is conducted at temperatures ranging from about 170° C. to about 200° C. Under conditions where condensable sulfur is formed, mercury is removed.

The amount of oxygen present during the reaction can be adjusted to affect the efficiency of oxidation of $H_2S$ and the relative amounts of $SO_2$ and sulfur generated on oxidation of $H_2S$. In principle, sufficient oxygen may be present in a gas stream to allow a desired level of oxidation of $H_2S$ and the generation of the desired ratio of $SO_2$ to sulfur. Most often, however, oxygen, typically added as air, will be added to the gas stream to adjust the ratio of $O_2$ to $H_2S$ in the gas stream. The amount of oxygen in the gas stream to be contacted with the catalysts of this invention depends on the amount of $H_2S$ present and generally is adjusted to obtain a selected ratio of $O_2$ to $H_2S$. Typically the oxygen is adjusted so that the $O_2$ to $H_2S$ ratio is within a range from about 0.3 to about 2. Where partial oxidation products, e.g., higher amounts of sulfur compared to $SO_2$ are desired, lower ratios of $O_2$ to $H_2S$ are used (about 0.4 to about 1.0). In a specific embodiment, the ratio of $O_2$ to $H_2S$ is adjusted to about 0.5 to enhance generation of sulfur and facilitate mercury removal. Where higher amounts of $SO_2$ are desired, higher ratios of $O_2$ to $H_2S$ (about 1.0 to 1.75 or greater than about 1.75) can be used.

The invention relates to a catalytic process that can be used to oxidize hydrogen sulfide ($H_2S$) into elemental sulfur, or a mixture of elemental sulfur and sulfur dioxide ($SO_2$) gas with the selectivity to each product determined by the amount of oxygen present (more specifically the $O_2/H_2S$ ratio), the temperature selected, and variations in catalyst composition. Mercury removal accompanies sulfur condensation. The process can be used to generate $SO_2$ and sulfur for any process, but is particularly useful for applications to liquid phase sulfur recovery and to desulfurization processes. The catalyst and process can be used to oxidize $H_2S$ into sulfur, for example, for use upstream of liquid redox sulfur recovery systems such as the LO-CAT processes or the SulFerox process, or can be used to oxidize $H_2S$ into sulfur and $SO_2$, for example, for feeding a mixture of $H_2S$ and $SO_2$ to liquid phase Claus sulfur recovery systems, such as the Crystasulf$^{SM}$ non-aqueous liquid phase Claus process, and for feeding into conventional Claus units. In the latter application, the catalytic reactor can preferably be used as a replacement for the Claus furnace in a Split Flow Claus Process. The preferred ratio of $H_2S$ to $SO_2$ for a Claus process is 2:1. The catalytic reactor of this invention can provide this ratio. However, the reactor can be operated to provide a range of ratios of $H_2S$ to $SO_2$ (e.g., about 1:1 to about 3:1) which can be processed in a Claus reactor. The catalyst and process can also be used to oxidize $H_2S$ into sulfur, for example, for use upstream of biological treatment processes such as Shell-Paques process, scavenger processes, or amine acid gas separation processes.

The methods of this invention can be used to desulfurize and remove mercury from gases containing CO and hydrogen, particularly those gases that are categorized as synthesis gas. The methods of this invention are useful for desulfurization of synthesis or gasification gas streams containing about 1% by volume or more of CO, $H_2$, or both, are useful for desulfurization of gas streams containing about 10% by volume or more of CO, $H_2$, or both, and are useful for desulfurization of gas streams containing about 30% by volume of CO, $H_2$ or both. Additionally, the methods of this invention are useful for desulfurization of synthesis or gasification gas streams containing from 1%–10% by volume, 2% to 10% by volume or 2% by volume or more of CO, $H_2$ or both. In this application, preferred desulfurization catalysts minimally oxidize (oxidize less than about 5% by volume of and more preferably less than about 2% by volume of) the CO and $H_2$ components of the gas stream. The methods of this invention can be used to remove or reduce mercury levels in gas streams containing from 1 ppb to 1 ppm mercury.

The methods of this invention will also oxidize $H_2S$ into sulfur, or sulfur and $SO_2$ (dependent upon the amount of oxygen present) when the $H_2S$ is present in natural gas without any substantial oxidation of any of the hydrocarbons present in the natural gas. Mercury is removed when sulfur is condensed. This permits direct removal of $H_2S$ from natural gas without the use of amine pretreatment. The catalyst will oxidize $H_2S$ into sulfur, or sulfur and $SO_2$ in the presence of saturated hydrocarbons, as well as, aromatic hydrocarbons, specifically BTEX components.

The methods of this invention can also be used to decrease the levels of mercaptans in gas streams.

Hydrogen sulfide oxidation of this invention can be carried out between ambient pressure and about 1000 psig in the presence of hydrocarbons, CO, hydrogen, $CO_2$ or water vapor. More typically, the operating pressure of the reaction can be up to about 500 psig. The maximum allowable operating pressure is determined by the dew point pressures of elemental sulfur, water and hydrocarbons in the system so as to avoid condensation of these components into the liquid phase. This maximum allowable pressure depends on the composition of the gas entering the process and the temperature at which the catalytic reaction is operated.

The catalytic $H_2S$ oxidation technology of this invention can, in addition to removing mercury contaminant, provide a source of $SO_2$, for sulfur recovery processes (Claus processes) eliminating the need for either shipping in liquid or compressed $SO_2$ from an external source, or installing a sulfur burner system upstream of a liquid-phase or conventional Claus sulfur recovery plant. This lowers capital and operating costs of the plant by simplifying the process and decreasing the size of the unit compared to the case where extra $SO_2$ is added either as gas, liquid or from sulfur burning. The size of the plant unit is reduced because the use of any of the conventional methods of supplying the necessary $SO_2$ increases the total amount of sulfur (sulfur load) that must be processed. The inventive process is also useful in any process where $SO_2$ is required and a source of $H_2S$ is available.

The inventive process can also, in addition to mercury removal, be used to reduce the sulfur burden of downstream high-efficiency sulfur recovery processes, such as LO-CAT and SulFerox. By controlling the catalyst operating temperature and the amount of $O_2$ added as air, the composition of the product gas from the inventive process can be adjusted so the recovery of elemental sulfur is high and the concentration of $SO_2$ is very low. This is done by decreasing the amount of $O_2$ and operating at relatively low temperatures (just above the sulfur dew point) so that some of the $H_2S$ remains unconverted. This gas stream (now with a lower $H_2S$ concentration) is then processed in the sulfur recovery unit The inventive process can also specifically be used to replace the furnace of a Split-Flow Claus unit for processing low concentrations of $H_2S$. For gases with $H_2S$ concentrations below about 40%, it is difficult to obtain stable combustion, if the entire gas stream is to be burned to obtain the correct $H_2S$ to $SO_2$ ratio. The conventional solution to this problem has been to bypass up to ⅓ of the gas and burn all of the $H_2S$ in that stream to $SO_2$ and to then remix the $SO_2$ stream with the remaining ⅔ gas stream contain unconverted $H_2S$ before entering the first catalytic Claus stage. The inventive process can be used to generate the required $SO_2$ for the Split-Flow Claus process. By controlling the amount of air added to the direct oxidation catalytic reactor of this invention and operating at moderate temperatures (approximately 200° C.), $H_2S$ can be converted in the split stream into $SO_2$ and elemental sulfur.

In another specific embodiment, the catalytic direct oxidation reactions and mercury removal of this invention can be combined upstream of art-known Claus Tail Gas Treatments, such as the SCOT process (particularly for medium-scale sulfur removal) or upstream of art-known scavenging chemicals (particularly for small-scale or medium scale sulfur removal).

In further specific embodiments, the catalytic direct oxidation reactions and mercury removal of this invention can be combined with biological sulfur removal processes such as the Shell-Paques, the THIOPAQ process or the Thiopaq $DeSO_x$ process. The catalytic process of this invention can, for example, be employed to maximize sulfur production and removal, along with mercury, from a gas stream with residual $H_2S$, $SO_2$ or mixtures thereof passed into directly or indirectly into appropriate aerobic and/or anaerobic biological reactors (containing selected microorganisms for conversion of sulfide and/or sulfite to elemental sulfur).

In another specific embodiment, the catalytic direct oxidation reactions and mercury removal of this invention can be combined with acid gas recycling to generate gas streams that are appropriate for pipeline specifications. Sulfur remaining in a gas stream after application of the direct oxidation can be separated (e.g., condensed along with mercury) from that gas stream and the treated gas stream is recycled back to the direct oxidation unit. This recycling can be performed continuously or as needed to achieve a desired level of sulfur removal. In general any process that can separate acid gases from the gas stream (e.g., that can separate $H_2S$ and/or $SO_2$ from the gas stream) can be employed for recycling. More specifically, an amine unit, which captures and separates acid gases can be employed. A variety of amine units are known in the art which employ various amine compounds for capture of the acid gases. Any amine unit appropriate for the use with a given gas source can be applied in combination with the direct oxidation of this invention. Those of ordinary skill in the art can readily select an amine unit or other device or system for separation of $H_2S$ and/or $SO_2$ appropriate for combination with the direct oxidation of this invention and for use with a given gas source.

In another specific embodiment, the invention provides methods for converting hydrogen sulfide into elemental sulfur or a mixture of sulfur and $SO_2$ in a feed gas stream containing carbon monoxide (CO), hydrogen ($H_2$) and hydrogen sulfide, and for removing mercury from that gas stream. The method and catalysts of this invention selectively oxidize hydrogen sulfide in such feed streams preferably without any substantial oxidation of carbon monoxide or hydrogen. For example, the methods and catalysts of this invention can be used to obtain high efficiency conversion of $H_2S$ and mercury removal with substantially no oxidation of CO and hydrogen (e.g., such that less than about 10% by volume of the CO and hydrogen are oxidized).

The catalysts used in the invention can, for example, be employed in the form of particles, pellets, extrudates (of varying sizes) or the like in fixed bed reactors and/or fluidized bed reactors. Catalyst form and size are selected as is known in the art for a given reactor type and reaction conditions. Catalyst reactors employed in the process of this invention may be provided with internal temperature control and/or heat removal systems, particularly where gas streams having higher concentrations of $H_2S$ (>1–2%) are to be treated. Catalytic oxidation processes of this invention can generally be run with space velocity between about 100 and about 20,000 $m^3$ of gas/$m^3$ of catalyst/hour. Alternatively the space velocity can be between about 500 and about 10,000 $m^3$ of gas/$m^3$ of catalyst/hour or between about 1,000 to about 5,000 $m^3$ of gas/$m^3$ of catalyst/hour. The catalysts of this invention can be employed in any catalytic reactor design known in the art appropriate for the pressure and temperature conditions of the reaction and appropriate for receiving the gas stream (with any added air/oxygen and adapted for recycling of gases if desired) to be treated and the catalysts of this invention. Fixed and fluidized bed reactors can be employed, for example. Any art-known sulfur condenser can be employed.

The invention also provides a catalytic reactor system for selectively oxidizing hydrogen sulfide in a gas stream containing hydrogen sulfide to sulfur dioxide, sulfur or mixtures thereof while reducing the concentration of mercury in the gas stream. The system includes a catalytic reactor containing a mixed metal oxide catalyst of this invention and a sulfur condenser for removing sulfur produced in the catalytic reaction The entering gas stream containing hydrogen sulfide and optionally other sulfur-containing species is mixed with an oxygen-containing gas (e.g., air) and contacted with the catalyst in the catalytic reactor at a selected temperature. Sulfur is removed from the gas stream exiting the reactor by condensation in the condenser to produce a treated gas stream containing lower levels of sulfur-containing species than the entering gas stream. The elemental mercury present in the gas stream reacts with sulfur and forms HgS which is removed in the condenser to produce a gas stream with mercury levels reduced. The catalytic reactor system can further be optionally equipped with a recycling system for directing at least a portion of the gas stream exiting the catalytic reactor back through the catalytic reactor (typically being mixed with the entering gas stream and the oxygen-containing gas) for removal of additional $H_2S$ or other sulfur-containing species.

The catalytic reactor system of this invention can optionally be combined with upstream guard beds for removal of other nondesirable components, for example, for arsenic removal.

The treated gas may be released from the system if the levels of hydrogen sulfide or other sulfur-containing species are sufficiently low. Alternatively, the treated gas may be recycled or passed to downstream processing, for example, for additional treatment to further decrease the levels of hydrogen sulfide or other sulfur-containing species in the gas stream. The downstream processing can include processing in one or more sulfur-removal or recovery processes known in the art. Exemplary downstream processing include, but are not limited to:

treating the exiting gas stream with scavenging chemicals;
passing the exiting gas stream into a liquid phase redox sulfur removal system;
passing the exiting gas stream into a tail gas treatment system;
passing the exiting gas stream into a liquid Claus sulfur removal system; or passing the exiting gas stream into a Claus reactor.

The catalytic reactor can optionally be equipped with a gas stream bypass for directing a portion of the entering gas stream directly to downstream processing. A gas stream bypass can be used, for example, to adjust the ratio of $H_2S$ to $SO_2$ that enters downstream processing. A recycling system can also be combined with downstream processing wherein at least a portion of the gas stream exiting downstream processing is recycled through the system used for downstream processing or is recycled back through the catalytic reactor. Most preferably, the treated gas exiting the catalytic reactor system with optional downstream processing contains 4 ppmv or less of $H_2S$.

The invention is further illustrated by the following detailed description, the drawings and specific examples.

DETAILED DESCRIPTION OF THE INVENTION

Figure 1:
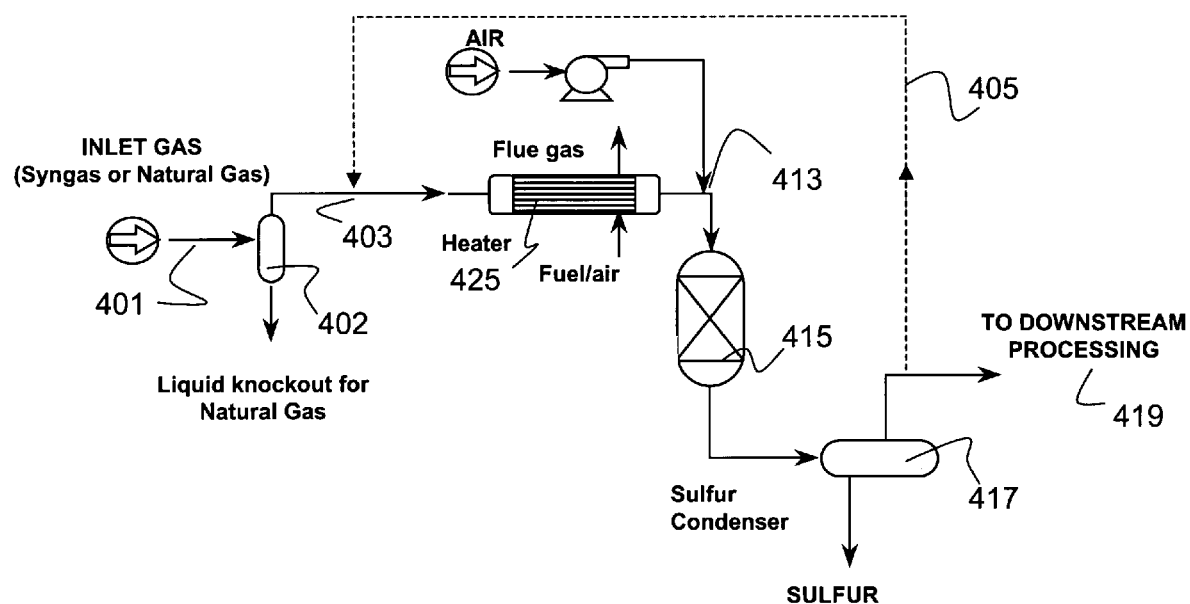
FIG. 1 is a schematic illustration of a catalytic reactor configured for the direct oxidation reaction of this invention with a sulfur recovery condenser. The process is illustrated for syngas or natural gas treatment and has an optional liquid knock out device. Optional downstream processing or recycling of the gas stream exiting the reactor is indicated.

The invention is based at least in part on the discovery that mercury in gas streams, such as natural gas and synthesis gas, can be removed or its levels reduced by treatment employing certain selective oxidation processes. The process of this invention converts hydrogen sulfide in such gas streams, at least in part, to elemental sulfur which is condensed and removed from the gas stream. Elemental mercury present in such gas streams is converted to mercuric sulfide in the presence of sulfur and removed in the sulfur condenser.

Catalysts suitable for use in selective $H_2S$ oxidation and Hg removal processes herein should:
- exhibit low activity for hydrocarbon oxidation (e.g., paraffinic, olefinic and aromatic hydrocarbons);
- resist deactivation by common natural gas contaminants (e.g., BTEX);
- preferably give high conversions for $H_2S$ oxidation (lowering the catalyst bed volume);
- exhibit high selectivity for $SO_2$ under selected conditions; and
- exhibit high selectivity for elemental sulfur under selected conditions.

The catalysts useful for the present invention which have been found to exhibit the listed properties are mixed metal oxides comprising a low oxidation activity metal oxide selected from the group of titania, zirconia, silica, alumina or mixtures thereof in combination with one, two, three, four or more metal oxides having a higher oxidation activity compared to the low oxidation activity metal oxide. Both alpha alumina and gamma alumina are useful as low oxidation activity metal oxides. The higher oxidation activity metal oxides can be transition metal oxides, lanthanide metal oxides or both selected from oxides of V, Cr, Mn, Fe, Co, Ni, Cu, Nb, Mo, Tc, Ru, Rh, Pd, Hf, Ta, W, Re, Os, Ir, Pt, Au, La, Ce, Pr, Nd, Pm, Sm, Eu, Gd, Tb, Dy, Ho, Er, Tm, Yb, Lu, or mixtures thereof. Preferred high oxidation activity transition metal oxides are those that are oxides of V, Cr, Mn, Fe, Co, Ni, Cu, Nb, Mo, W, and mixtures thereof. A preferred high oxidation activity lanthanide metal oxide is that of La. More preferred higher oxidation activity metal oxides are oxides of V, Cr, Mn, Fe, Co, Ni, Cu, Nb, Mo, or mixtures thereof. Yet more preferred higher oxidation activity metal oxides are oxides of Nb, Mo, Cr, Mn, Fe, Co or Cu. Preferred mixed oxide catalysts of this invention comprise two, three or four high oxidation activity metal oxides.

Selected catalysts useful for the invention include mixed metal oxides containing 50% by weight or more of titania, silica, alumina or mixtures thereof (a low oxidation activity metal oxide) in combination with one or more metal oxides of V, Cr, Mn, Fe, Co, Ni, Cu, Nb, or Mo. Selected catalysts useful for the invention include mixed metal oxides containing 50% by weight or more of titania, silica, alumina or mixtures thereof (a low oxidation activity metal oxide mixture) in combination with one or more metal oxides of Cr, Mn, Fe, Co, Cu, Nb, or Mo. Selected catalysts useful for the invention include mixed metal oxides containing from about 0.1% to about 10% by weight of one or metal oxides of Cr, Mn, Fe, Co, Cu, Nb, or Mo wherein the remainder of the catalyst is titania, zirconia, silica, alumina or a mixture thereof. Selected catalysts useful for the invention include mixed metal oxides containing about 0.1% to about 15% by weight of an oxide of Mo and optionally about 0.1% to about 10% by weight of one or more metal oxides of Nb, Fe, Co or Cu wherein the remainder of the catalyst is titania, zirconia, silica, alumina or a mixture thereof.

Selected catalysts useful for the invention include: those containing from 0.1% to about 10% by weight of an oxide of Mo, an oxide of Nb or both and from about 1% to about 10% by weight of an oxide of Fe, Cu or Co; those comprising about 1 to about 10% by weight copper oxide, about 1 to about 10% by weight niobium oxide, and about 0.1 to about 1% by weight molybdenum oxide with the remainder being titania or a mixture of titania and silica: those comprising about 1 to about 10% by weight iron oxide, about 1 to about 10% by weight niobium oxide, and about 0.1 to about 1% by weight molybdenum oxide with the remainder being titania or a mixture of titania and silica; and those comprising about 1 to about 10% by weight cobalt oxide, about 1 to about 10% by weight niobium oxide, and about 0.1 to about 1% by weight molybdenum oxide with the remainder being titania or a mixture of titania and silica.

Selected catalysts useful for the invention include mixed metal oxides containing 75% by weight or more of titania, silica, alumina or mixtures thereof (a low oxidation activity metal oxide) in combination with one or more metal oxides of V, Cr, Mn, Fe, Co, Ni, Cu, Nb, or Mo. Selected catalysts useful for the invention include mixed metal oxides containing 75% by weight or more of titania, silica, alumina or mixtures thereof (a low oxidation activity metal oxide mixture) in combination with one or more metal oxides of Cr, Mn, Fe, Co, Cu, Nb, or Mo. Selected catalysts useful for the invention include mixed metal oxides containing from about 1% to about 25% by weight of one or more metal oxides of Cr, Mn, Fe, Co, Cu, Nb, or Mo wherein the remainder of the catalyst is titania, zirconia, silica, alumina or a mixture thereof. Selected catalysts useful for the invention include mixed metal oxides containing about 1% to about 25% by weight of an oxide of Mo. Selected catalysts useful for the invention include those containing about 0.1% to about 10% by weight of one or more metal oxides of Nb, Fe, Co or Cu and about 0.1% to about 15% by weight of an oxide of Mo wherein the remainder of the catalyst (75% by weight or more) is titania, zirconia, silica, alumina or a mixture thereof.

Selected catalysts useful for the invention include mixed metal oxides containing about 0.1% to about 25% of an oxide of Mo wherein the remainder of the catalyst is titania, silica, alumina or a mixture thereof. Selected catalysts useful for the invention also include mixed metal oxides containing about 0.1% to about 10% of an oxide of Mo wherein the remainder of the catalyst is titania, silica, alumina or a mixture thereof. Selected catalysts useful for the invention also include mixed metal oxides containing about 1% to about 10% by weight of one or more metal oxides of Fe, Co, Cu, or Nb and about 0.1% to about 10% by weight of an oxide of Mo wherein the remainder of the catalyst is titania, silica, alumina or a mixture thereof. Selected catalysts useful for the invention further include mixed metal oxides containing about 1% to about 10% by weight of one or more metal oxides of Fe, Co, or Cu, 1% to about 10% by weight of niobium oxide and about 0.1% to about 10% by weight of molybdenum oxide wherein the remainder of the catalyst is titania, silica, alumina or a mixture thereof. Preferably the majority component (more preferably 50%–about 90% by weight) of all selected catalysts is titania.

Selected catalysts useful for the invention further include mixed metal oxides containing about 0.4% to about 6.0% by weight of an oxide of Mo wherein the remainder of the catalyst is titania, zirconia, silica, alumina or a mixture thereof. Selected catalysts useful for the invention also include mixed metal oxides containing about 0.4% to about 6.0% by weight of an oxide of Mo, and 0.4% to about 6.0% by weight of an oxide of Nb wherein the remainder of the catalyst is titania, zirconia, silica, alumina or a mixture thereof. Selected catalysts useful for the invention further include mixed metal oxides containing about 4% to about 6% by weight of an oxide of Fe; Co, Cu, Nb or a mixture thereof, and about 0.4% to about 6.0% by weight of an oxide of Mo wherein the remainder of the catalyst is titania, zirconia, silica, alumina or a mixture thereof. Selected catalysts useful for the invention also include mixed metal oxides containing about 4% to about 6% by weight of an oxide of Fe; Co or Cu or a mixture thereof, about 4% to about 6% by weight of an oxide of Nb and about 0.5% to about 1% by weight of an oxide of Mo wherein the remainder of the catalyst is titania, silica, alumina or a mixture thereof. Preferably the majority component (more preferably 50%–about 90% by weight) of all selected catalysts is titania. In specific embodiments the mixed metal catalysts useful for the invention are generated by coforming methods.

Exemplary catalysts useful for the invention include those which comprise about 0.4% to about 6% by weight of molybdenum oxide in combination with titania, zirconia, silica, alumina or a mixture thereof. Exemplary catalysts useful for the invention include those which comprise about 0.4% to about 6% by weight of molybdenum oxide and about 0.4% to about 6% by weight of niobium oxide in combination with titania, zirconia, silica, alumina or a mixture thereof. Exemplary catalysts useful for the invention also include those which comprise about 4% to 6% by weight of iron oxide; cobalt oxide or copper oxide or a mixture thereof, about 4% to about 6% by weight of niobium oxide and about 0.4% to about 6% by weight of molybdenum oxide in combination with titania, zirconia, silica, alumina or a mixture thereof. Exemplary catalysts useful for the invention include those which comprise about 4% to 6% by weight of iron oxide, cobalt oxide, or copper oxide or a mixture thereof, about 4% to about 6% by weight of niobium oxide and about 0.5% to about 1% by weight of molybdenum oxide in combination with titania. Further exemplary catalysts useful for the invention include those which comprise about 5% by weight iron oxide; cobalt oxide or copper oxide, about 5% by weight of niobium oxide and about 0.5% to about 1% by weight of molybdenum oxide in combination with titania, zirconia, silica, alumina or a mixture thereof. Yet further exemplary catalysts useful for the invention include those which comprise about 5% by weight iron oxide; cobalt oxide or copper oxide, about 5% by weight of niobium oxide and about 0.5% to about 1% by weight of molybdenum oxide in combination with titania.

In specific embodiments the catalysts useful for the invention include those where the catalyst is formed from a low oxidation activity oxide support that is resistant to sulfation, for example, a support of silica ($SiO_2$), titania ($TiO_2$) or a mixture thereof, that has been modified to contain 1% to about 10% of a first higher oxidation activity metal oxide chosen from metal oxides of V, Cr, Mn, Fe, Co, Ni, Cu, Nb, Mo, Tc, Ru, Rh, Hf, Ta, W, Au, La, Ce, Pr, Nd, Pm, Eu, Gd, Tb, Dy, Ho, Er, Tm, Yb, and Lu and then further modified with a second and third higher oxidation activity metal oxide wherein the first, second and third higher oxidation activity metal oxides are oxides of different metals. Preferred modifying higher activity metal oxides are those of Mo, Nb, Fe, Cr, Cu and Co.

Silica, silica gel or other binders can also be used in the preparation of catalysts of this invention and the exact nature of the binder is unimportant; however, in the preferred formulation, aluminum oxide is avoided to minimize any sulfation reactions that may occur by reaction of the aluminum oxide with $SO_2$. The amount of binder can vary from 1 wt % to 25 wt % with the preferred amount being 10% of the original weight of the powder mixture (e.g. 10 gm of binder for each 100 gm of mixed powders). Mixed metal oxide catalysts of this invention can comprise up to about 105 by weight of a binder. The preferred binder is silica.

The catalysts used in the invention can be prepared by any method of combination of methods known in the art. However, the catalysts are preferably prepared by co-forming methods or by a combination of co-forming and impregnation techniques as described in the U.S. publication no. 2003/0194366A1. Coprecipitation and combinations of coprecipitation and impregnation or coprecipitation and co-forming and combinations thereof can also be used to prepare the catalysts. Starting materials (various metal compounds) for preparation of the catalysts herein are readily available. As is known in the art, starting materials may contain low levels of impurities, particularly metal impurities, in general such impurities have not been found to affect catalytic activity. Higher purity starting materials may be employed or art-known methods may be employed to purify starting materials in those cases in which a detrimental affect of impurities on activity is detected.

Catalysts useful in this invention include those prepared by calcining a mixed metal oxide powder at a temperature of about 300° C. to 550° C. and those prepared by calcining a mixed metal oxide powder at a temperature of about 400° C. to 450° C.

Technical grade materials (generally containing 95% or more by weight of the chemical of interest) are sufficiently pure for preparing the preferred catalysts. Small levels of impurities of various metals (V, Cr, Mn, Fe, Co, Ni, Cu, Nb, Mo, Tc, Ru, Rh, Pd, Hf, Ta, W, Re, Os, Ir, Pt, Au, La, Ce, Pr, Nd, Pm, Sm, Eu, Gd, Tb, Dy, Ho, Er, Tm, Yb, Lu) present as impurities will not significantly adversely affect catalytic properties.

The catalysts used in the invention are prepared as metal oxides. After exposure to gas streams containing $H_2S$, $SO_2$ and/or other sulfur-containing species, the catalysts may be converted at least in part to sulfide or sulfate which are active for oxidation. In addition, the oxidation states of the metal oxides may change during the reaction or pretreatment.

Metal oxide catalysts used in the invention can be characterized by XRD, XPS, XRF and multi-point BET pore size distribution assays, if desired. Pore size and pore-size distribution of the catalysts herein can be adjusted if desired employing methods that are well-known in the art. For example, the pore size and pore-size distribution of a given catalyst can be increased by the addition of pore-forming precursor materials to the metal oxide powders, such as hydroxymethylcellulose or polyethylene glycol, which will burn away during calcination, leaving behind larger pores.

The surface area of a given catalyst can be measured using methods that are well-known in the art and surface area of a given catalyst can be adjusted or selected using methods that are well-known in the art. Catalysts of this invention include those having a surface area ranging from about 50 to about 150 $m^2/g$.

The methods herein can be used generally in any application where either sulfur or a selected combination of $SO_2$ and sulfur are desired products and the feedstock contains mercury and $H_2S$. Sulfur dioxide or sulfur may be desired as a starting material or reagent (e.g., $SO_2$ may be employed as an oxidizing agent) in a process (e.g., in a synthetic process). The methods of the invention can be employed to remove or reduce the level of undesired $H_2S$ and Hg present in a gas stream. In this case, $SO_2$ and/or sulfur may be more readily removed from a given gas stream than $H_2S$.

The catalytic processes of this invention are designed to oxidize $H_2S$, at least in part, to elemental sulfur in a gas stream that contains $H_2S$ concentrations from a few ppm up to tens-of-percents. The inventive process can generally be used to remove or decrease the levels of $H_2S$ in the gas stream, to generate elemental sulfur for various applications, to generate a selected mixture of $SO_2$ and sulfur or a selected mixture of $H_2S$ and $SO_2$.

Again in general, the catalytic oxidation and the removal method of the invention and a catalytic reactor carrying out the oxidation method can be combined upstream or downstream as appropriate with any one or more compatible sulfur recovery or removal processes that are known in the art. The methods herein can in general be combined with any art-known sulfur recovery or removal process that can be operated such that the pressure range, temperature range, and/or component concentration (e.g., $H_2S$, $O_2$, etc.) range, if any, of any gas stream(s) linking the processes are within (or can be reasonably adjusted to be within) the operational range of the inventive process.

For example, the inventive process can be operated downstream of a chemical or catalytic process in which various sulfur-containing species in a gas stream are converted to $H_2S$. More specifically, the $H_2S$ oxidization and Hg reduction methods herein can be combined with known methods (e.g., hydrogenation/hydrolysis process) for converting other sulfur containing species, such as $SO_2$, COS, $CS_2$ and/or mercaptans (e.g, RSH, R is aliphatic) to $H_2S$.

The inventive process can be operated downstream of a combustion, adsorption, fractionation or reactive process which decreases the level of any undesired gas component, e.g., $H_2S$ (assuming residual $H_2S$ remains), $SO_2$, particulates, aerosols (e.g., containing hydrocarbons), condensate (e.g., containing heavier hydrocarbons), heavier hydrocarbons, etc. The inventive process can be operated downstream of a concentration, fractionation, adsorption or reactive process that increases the level of any desired gas component. The inventive process can be operated downstream of a less than completely efficient sulfur removal process for removal of residual $H_2S$ to increase efficiency.

Alternatively, or in combination, the inventive process can be operated upstream of a sulfur removal process (chemical or biological) to decrease the sulfur load on that process. The inventive process of this invention can also be operated upstream of a sulfur removal or recovery system that requires or exhibits improved operation at a selected ratio of $H_2S$ to $SO_2$. The inventive process of this invention can be operated upstream of a sulfur removal or recovery system that is detrimentally affected by the presence of $SO_2$ to reduce $SO_2$ levels entering the system and improving overall efficiency.

Compatible processes can be linked, typically by transfer of a product gas stream from one process to the feed inlet of another process directly or by intervening cooling, heating, pressure adjustment, water removal, solvent removal, filtering equipment or related processing equipment as will be appreciated by those of ordinary skill in the art.

Selective oxidation of $H_2S$ in the presence of other oxidizable components is achieved by use of catalysts herein, in appropriate catalytic reactor systems, and with selection of the temperature at which the catalytic reaction is conducted. In general, any type of catalytic reactor can be employed that is appropriate for bringing the gas stream to be treated into contact with the catalyst and other reactant (air or oxygen). Fixed bed and fluidized bed reactors can be employed. Typically the feed gas stream is heated sufficiently high before entering the catalytic reactor such that the temperature in the reactor is within a relatively small range around a selected temperature. A catalytic reactor for conducting the $H_2S$ oxidation of this invention can, alternatively or in addition, be provided with a heater or cooling equipment as needed to maintain the desired temperature range. A catalytic reactor for the inventive process can optionally include metering valves for controlling gas streams entering and leaving the reactor. Gas flows (e.g., component concentrations), pressures and temperatures in the reactor can be measured and controlled using methods and equipment that is well-known in the art.

The temperature of the reaction is kept below about 400° C. to avoid or minimize unwanted oxidation and to decrease energy requirements. Generally, the more active the metal oxide catalyst, the lower the reaction temperature that should be used with the caveat that the reaction temperature should be maintained sufficiently above the sulfur dew point to avoid detrimental levels of sulfur condensation in the reactor. Sulfur condensation onto the catalyst which can lead to catalyst deactivation and may require catalyst regeneration is preferably avoided. The more preferred temperature range for operation is between about 160° C. to about 250° C., dependent upon the sulfur dew point.

Methods of this invention can be used to oxidize $H_2S$ substantially to S (with less than about 10–15 mol % $SO_2$) or substantially to $SO_2$ (with less than about 10 mol % S). Methods of this invention can be used to oxidize $H_2S$ essentially to S (with less than about 5 mol % of $SO_2$) or essentially to $SO_2$ (with less than about 5 mol % of S).

The catalysts and catalytic process of this invention are selective for the oxidation of $H_2S$ in the presence of various other oxidizable species, including aliphatic and aromatic hydrocarbons, CO and $H_2$, as well as in the presence of non-oxidizable components such as $CO_2$.

Because methane, BTEX and NGL (natural gas liquid) hydrocarbons are not oxidized during $H_2S$ oxidation at temperatures below about 300° C., the inventive process can be used to directly desulfurize natural gas streams that contain either low or high concentrations of methane and $CO_2$ as well as BTEX and NGL hydrocarbons.

A wide range of natural gas compositions can be treated for sulfur removal by the processes of this invention. Table 1 lists a field composition for a low concentration methane gas and Table 2 lists the composition of a methane-rich gas. Either gas can be effectively treated using the inventive direct oxidation process of this invention or employing sulfur removal and recovery processes of this invention in which the direct oxidation process is combined with art-known sulfur recovery or removal systems.

TABLE 3

Typical composition of a methane poor natural gas.

| Parameter | Value |
|---|---|
| $H_2S$ | 2000 ppm |
| $CO_2$ | 84.46 vol % |
| $N_2$ | Negligible |
| $CH_4$ | 9.95 vol % |
| $C_2H_6$ | 2.99 vol % |
| $C_3H_8$ | 1.99 vol % |
| Other | 0.32 vol % |
| Temperature | 60–110° F. |
| Pressure | 250–340 psig |
| Humidity | Sat. at 100° F. |

The process of the invention can be used to treat mercury levels in the gas stream between about 1 part per billion and about one part per million. In an embodiment, the gas stream contains from about 10 to about 30 parts per billion mercury.

TABLE 2

A composition for a methane-rich gas.

| Property | Value |
|---|---|
| Temperature | 85–100° F. |
| Pressure | Up to 1000 psig |
| Hydrogen sulfide ($H_2S$) | 0.2 mol % (2000 ppm) |
| Nitrogen ($N_2$) | 0.3 mol % |
| Carbon Dioxide ($CO_2$) | 0.54 mol % |
| Methane ($CH_4$) | 95.1 mol % |
| Ethane ($C_2H_6$) | 1.84 mol % |
| Propane ($C_3H_8$) | 0.72 mol % |
| Butanes ($C_4H_{10}$) | 0.61 mol % |
| Pentanes ($C_5H_{12}$) | 0.315 mol % |
| Hexanes ($C_6H_{14}$) | 0.23 mol % |
| Benzene ($C_6H_6$) | 0.07 mol % |
| Toluene ($C_6H_5CH_3$) | 0.026 mol % |
| Xylenes ($C_6H_4(CH_3)_2$) | 0.01 mol % |
| Total BTX | 1060 ppmv |

Further, the inventive process of combination processes of this invention can be used to desulfurize (or at least reduce the level of sulfur containing compounds in) synthesis gas streams and gasification product gas streams that contain CO and $H_2$. An example composition of Syngas from a gasifier is listed in Table 3.

TABLE 3

Typical composition of Syngas from a gasifier

| $N_2$ (g) | 1.9% |
|---|---|
| Ar (g) | 0.6% |
| $CO_2$ (g) | 15.8% |
| CO (g) | 45.3% |
| $H_2$ (g) | 34.4% |
| Hg (g), ppbv | 10 |
| $CH_4$ (g) | 1.9% |
| $H_2S$ (g) | 0.9% |

The direct oxidation process of this invention can be employed alone or in combination with other sulfur removal or recovery systems for high-pressure as well as low pressure gas streams for $H_2S$ removal. Typically low pressure gas streams constitute gas streams at 0–50 psi and high pressure gas streams constitute streams that are available at pressures higher than 50 psi. All of the processes that follow the direct oxidation process can be operated at high pressures, typically up to 1000 psi. In addition to natural gas streams and synthesis gas, the processes herein are also specifically applicable to removal of $H_2S$ from refinery fuel gas, from gas streams of $CO_2$ floods, from gases of geothermal sources, and from gases generated during waste water treatment.

Figure 2:
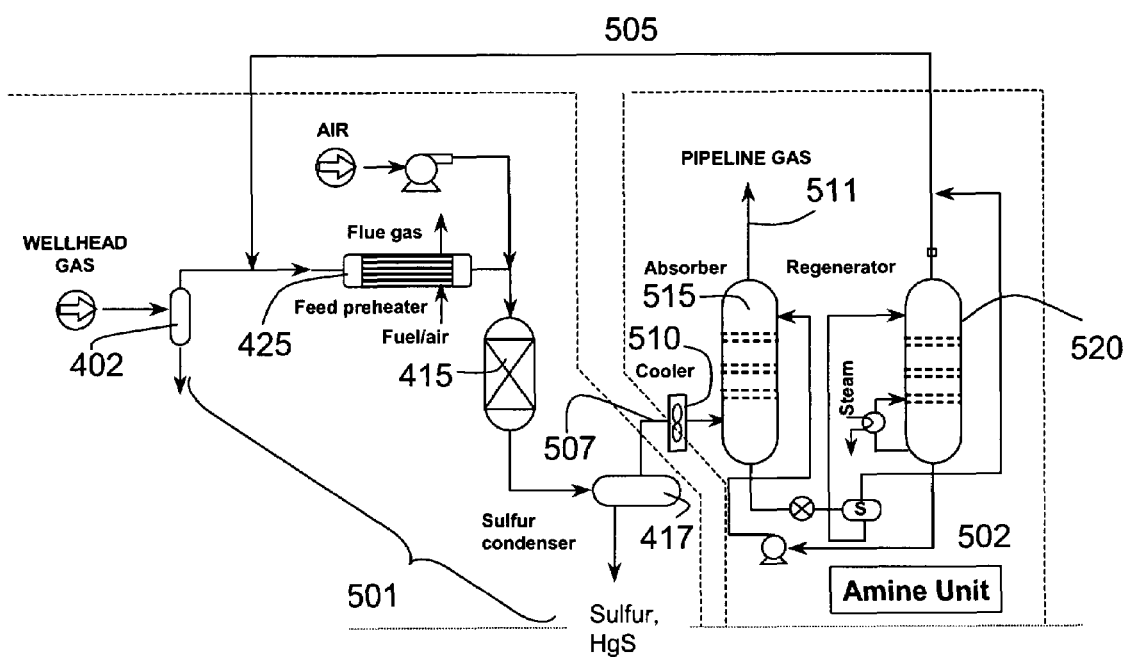
FIG. 2 is a schematic illustration of the catalytic reactor of this invention combined with a downstream amine unit (one exemplary downstream process) and configured for gas stream recycling.

Direct Oxidation of $H_2S$ and Hg Removal with optional Sulfur Recycling and Tail Gas Treatment The methods of this invention can be used in a direct oxidation process to remove sulfur and mercury from a sour natural gas stream. FIG. 1 illustrates an exemplary selective oxidation process and FIG. 2 illustrates a direct oxidation reactor upstream of a standard amine unit which exemplifies downstream processing with a tail gas treatment unit which separates acid gases from the process stream and allows $H_2S$ and/or $SO_2$ to be cycled back to the direct oxidation unit.

The process is illustrated for application to natural gas or syngas treatment. In the illustrated process, sour gas first enters a knockout drum (402) via inlet (401) where any natural gas liquids are removed. The use of a knockout drum or related device element is optional and dependent upon the components present in the gas stream to be treated. The sour gas (403, the term is used generically herein to refer to gas streams containing $H_2S$ and or $H_2S$ and $SO_2$) is then heated (heater, 425) to a temperature at least above the dew point of sulfur (calculated for 95% conversion of $H_2S$ into elemental sulfur), mixed with air (inlet 413) and passed into the catalytic reactor (415). In certain configurations, the gas is heated to a temperature such that the gas will be at the desired reaction temperature when it reaches the catalytic reactor. In other configurations, the catalytic reactor may be provided with heaters and or temperature control to allow selection of reaction temperature.

An optional guard bed (not shown) may be included upstream of the catalytic reactor (415) to remove undesirable components such as arsenic. Sorbents to remove arsenic and other undesirable components are known to those skilled in the art.

The mixture of air and sour gas enters the catalytic reactor (415) which contains the direct oxidation catalyst. This catalytic reactor can have any design appropriate for the selected reaction conditions and specifically can be either a fixed bed or fluidized bed reactor. The air flow rate is adjusted (flow meter not shown) so that the of oxygen to hydrogen sulfide is preferably between about 0.4 and about 5 and more preferably $O_2/H_2S$=about 0.5.

The catalytic reactor is operated above the dew point of the sulfur in the system to avoid undesired condensation of sulfur in the reactor and to facilitate recovery of the sulfur by condensation of the sulfur vapor in a condenser. The dew point temperature determines the minimum usable catalyst bed temperature (to avoid condensation in the bed) and this is a function of the inlet $H_2S$ concentration and $H_2S$ conversion in the catalytic reactor. Dew point temperatures for different starting sulfur vapor concentrations are readily calculated using known methods. The preferred operating temperature of the catalyst bed is between about 160° C. and about 250° C., more preferably between about 170° C. and about 200° C., depending on the amount of $H_2S$ in the feed stream. The direct oxidation catalyst (compositions as described above), makes a small amount of $SO_2$ in addition to elemental sulfur. Sulfur vapor, small amounts of $SO_2$, $CO_2$, water vapor and unreacted $H_2S$ exit the direct oxidation reactor and enter the sulfur condenser (417).

In the inventive process, elemental mercury reacts with sulfur to form HgS. The process is controlled so that HgS condensation occurs in the sulfur condenser. HgS is primarily expected in the condenser at 130 to 150° C. Some HgS formation is predicted at temperatures up to 180° C., which is the low temperature end of an $H_2S$ catalyst operated from 170 to 200° C. The formation of HgS can be predicted by methods known to the art on the basis of the temperature, pressure, and reactants present in the system. The amount of sulfur thermodynamically required to form HgS is the same as the mercury concentration (less than about 1 ppm). However, in practice, sulfur should be generated sufficiently in excess of the amount of Hg present to ensure high efficiency removal.

Sulfur is condensed as a liquid and is sent to storage. The condenser is operated at a temperature low enough to collect sulfur as a liquid, but not so low that solid sulfur freezes in the condenser. The efficiency of sulfur and HgS removal may depend on the sulfur condenser design. Sulfur condenser designs are discussed in Kohl and Neilsen and Fenderson. The processed gas stream is passed downstream (outlet 419) for further processing (e.g., tail gas treatment) if required. Gas exiting the sulfur condenser may optionally be recycled (405) back through the catalytic reactor. If the $H_2S$ content of the processed gas stream is sufficiently low, the treated gas may be flared or passed to an incinerator.

The configuration of FIG. 2 is an exemplary configuration used to increase sulfur recovery. $H_2S$, $SO_2$ or both are removed by the amine unit (502) and recycled (505) back to the direct oxidation reactor (501) where recycled $H_2S$ and $SO_2$ are converted to additional sulfur. The gas exiting the sulfur condenser (507) is further cooled (air-fin cooler (510) exemplified) before entering a standard amine gas absorption system (absorber 515 and regenerator 520). The amine chosen for use in the absorber depends on the composition of the gas exiting the sulfur condenser, which in turn, is a function of the composition of the natural gas being treated by direct oxidation. In general, the amine is selected to maximize removal of $H_2S$, $SO_2$ and $CO_2$ in the absorption step. The absorber is preferably designed so that the sweetened gas (exiting at outlet 511) meets pipeline specifications. The use and operation of amine gas absorption systems is well-known in the art. Rich amine from the gas absorber is sent to the amine regeneration unit (520). Stripped gas (enriched in $H_2S$, $SO_2$ and $CO_2$) from the regenerator is recycled (505) to the direct oxidation reactor (501). The recycle stream (505) from the amine unit regenerator is mixed with the incoming sour gas and heated. The direct oxidation reaction is responsible for recovering the sulfur present (believed to recover 85–95% of the sulfur present) in the natural gas. The direct oxidation of $H_2S$ (Equation 1) and the Claus reaction of $H_2S$ with $SO_2$ (Equation 2) function for generation of additional sulfur. In a preferred process configuration in combination with an amine unit, the catalysts and reaction conditions in the catalytic reactor are adjusted to minimize $SO_2$ generation.

$$H_2S + \frac{1}{2}O_2 \rightarrow H_2O + S$$

Equation 1. Partial oxidation of $H_2S$ into water and elemental sulfur.

$$2H_2S + SO_2 = 2H_2O = 3S$$

Figure 3:
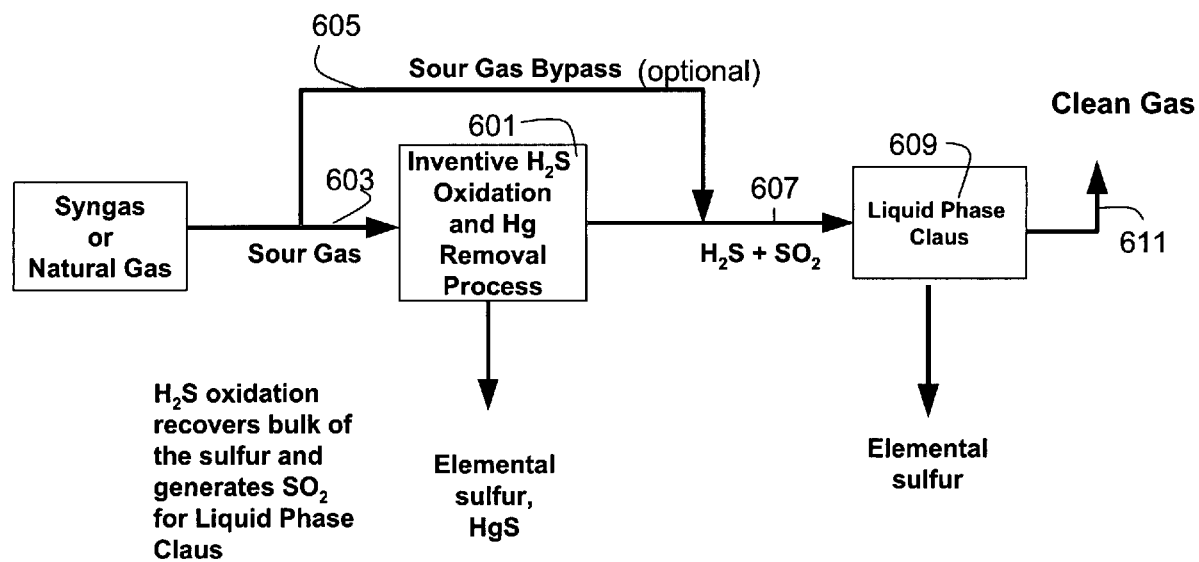
FIG. 3 is a schematic illustration of an exemplary process configuration in which a catalytic reactor of this invention is positioned upstream of a liquid phase Claus process. The catalytic reactor is operated to generate a mixture of $H_2S$ and $SO_2$, preferably with a $H_2S$ and $SO_2$ of 2:1, for introduction into the liquid Claus reactor. An optional sour gas bypass is illustrated to facilitate adjustment of the $H_2S$ and $SO_2$ as discussed in the specification.

Equation 2. Claus equilibrium reaction $H_2S$ Oxidation and Hg Removal Combined with a Liquid Phase Claus Process FIG. 3 schematically illustrates a sulfur recovery configuration in which a direct oxidation reactor of this invention (e.g., the reactor of FIG. 1) is positioned upstream of a liquid phase Claus process (aqueous or non-aqueous liquid phase), as exemplified by the non-aqueous liquid phase Crystasulf$^{SM}$ process. Again the process is illustrated for treatment of natural gas or synthesis gas, but can also be applied to refinery fuel gas and for hydrogen recycle gas streams in a refinery. Sour gas enters the oxidation and Hg removal process (601) at inlet 603. The inlet line is provided with an optional bypass (605) where a selected portion of the sour gas can be diverted past the oxidation reactor (flow controllers and metering valves not shown). The bypass line rejoins the gas stream exiting (607) the catalytic reactor of the oxidation process. The gas stream exiting the oxidation process along with any sour gas passed through the bypass line is introduced into the liquid phase Claus system (609). For example, the gas stream would be introduced into the absorber of a Crystasulf$^{SM}$ unit. Sweetened gas exits the system (611) or may be passed to another process system.

The gas stream can be split using the bypass to adjust the $H_2S$ to $SO_2$ ratio of the gas that enters the liquid phase Claus unit. Some of the flow passes through the catalytic reactor and preferably all of its $H_2S$ is converted into $SO_2$. The balance of the stream is then blended with the gas exiting the reactor and this mixture is then sent to the liquid phase Claus (e.g., Crystasulf$^{SM}$) unit. By controlling the splitting ratio to the catalytic reactor, the blended stream will contain the correct proportions of $H_2S$ and $SO_2$ for removal of the remaining sulfur using the liquid phase Claus process The liquid phase Claus process runs the Claus reaction in liquid phase (Equation 2). In a preferred operation, the direct oxidation catalytic process is used to oxidize approximately ⅓ of the $H_2S$ in the natural gas stream into $SO_2$ so that the proper $H_2S$ to $SO_2$ ratio (2:1) is present in the natural gas when it enters the liquid phase Claus process. The exact amount of gas sent to the catalytic reactor depends on how much elemental sulfur is recovered directly in the $H_2S$ oxidation step. The more sulfur that is recovered from the catalytic step, the greater the proportion of gas flow that must be sent to the reactor. However, the more sulfur that is recovered from the catalytic reactor, the lower the sulfur load for the liquid phase Claus process. Thus, there is a trade off in operation of the combined configuration between the capital and operating costs between the fixed bed reactor and the absorber. The optimum operating conditions depend on the activity of the solid catalyst and its selectivities for $SO_2$ and elemental sulfur.

Because methane and light hydrocarbons are inert over the catalyst of this invention, the $H_2S$ oxidation can be carried out in-situ in a natural gas stream; no upstream $H_2S$ processing is needed. In-situ oxidation can generate a preferred $H_2S/SO_2$ ratio of 2:1 within the natural gas stream for feeding to the liquid phase Claus.

In an exemplary embodiment, a selected amount of air (e.g. 3000 ppm for 2000 ppm of $H_2S$) is mixed with the natural gas and the stream is passed through a fixed bed reactor containing the catalyst. The stream exiting the reactor contains a $H_2S/SO_2$ ratio of about 2. The gas exiting the reactor contains the original natural gas components plus $H_2S$ and $SO_2$ in the proper ratio for processing in the liquid phase Claus reaction where $H_2S$ reacts with the $SO_2$ to produce solid sulfur and water.

The configuration in which direct oxidation is combined with a liquid Claus sulfur removal process, particularly the non-aqueous liquid phase Claus process (e.g., Crystasulf$^{SM}$) process, can be employed in the treatment of high-pressure as well as low pressure gas streams for $H_2S$ removal.

$H_2S$ Oxidation and Hg Removal Combined with Liquid Redox Sulfur Removal

Figure 4:
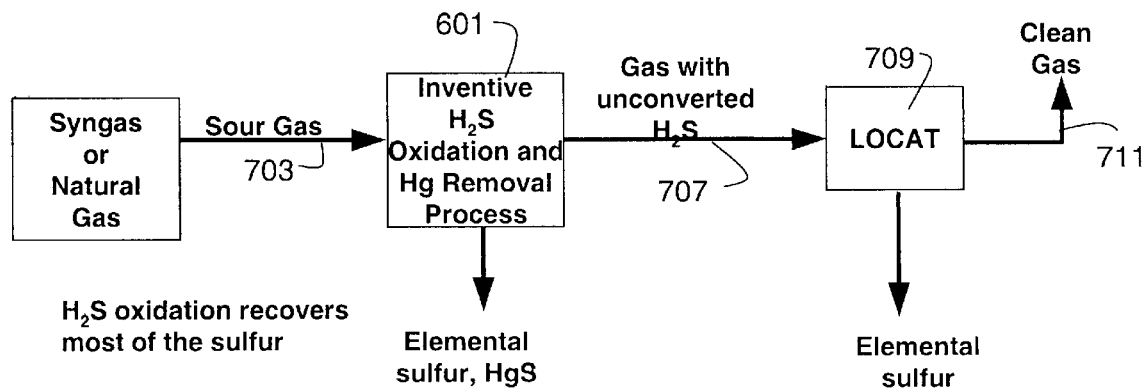
FIG. 4 is a schematic illustration of an exemplary process configuration in which a catalytic reactor of this invention is positioned upstream of a liquid redox sulfur removal process. A LO-CAT process is exemplified.

FIG. 4 schematically illustrates a sulfur removal/recovery configuration in which a direct oxidation reactor of this invention (e.g., the reactor of FIG. 1) is positioned upstream of a liquid redox sulfur removal process, as exemplified by the LO-CAT process. Again the process is illustrated for treatment of natural gas or synthesis gas, but may be applied to refinery fuel gas and hydrogen recycle streams in refineries. The inventive catalyst and process for sulfur removal can be used upstream of the LO-CAT process to reduce the size of the LO-CAT unit to reduce both capital costs and operating costs for sulfur recovery. Sour gas enters the oxidation process (601) at inlet 703. Elemental sulfur generated by direct oxidation is removed by condensation and gas exiting the oxidation process (707) which contains unconverted $H_2S$ is passed to the liquid redox process (709). For example, the gas stream exiting the oxidation process would be introduced into the LO-CAT absorber. Sweetened gas exits the system (711) or may be passed to another processing system.

By using sub-stoichiometric air and operating at a temperature just above the sulfur dew point, the process converts a portion of the $H_2S$ into elemental sulfur, leaving the remainder of the $H_2S$ unconverted. Little or no $SO_2$ is formed. The product gas exiting the inventive catalytic reactor is then processed in the liquid redox unit. By first removing the bulk of the sulfur with the inventive catalytic process as elemental sulfur, the size of the liquid redox unit, e.g., the LO-CAT unit, can be decreased and the chemical and operating costs of the unit will be lower compared to a unit designed to process all of the original $H_2S$ in the feed stream. The direct oxidation reaction of this invention can in general be combined with any liquid redox process, including the LO-CAT process, the LO-CAT II process and the Sulferox™ process.

$H_2S$ Oxidation and Hg Removal Combined with Biological Sulfur Removal

Figure 5:
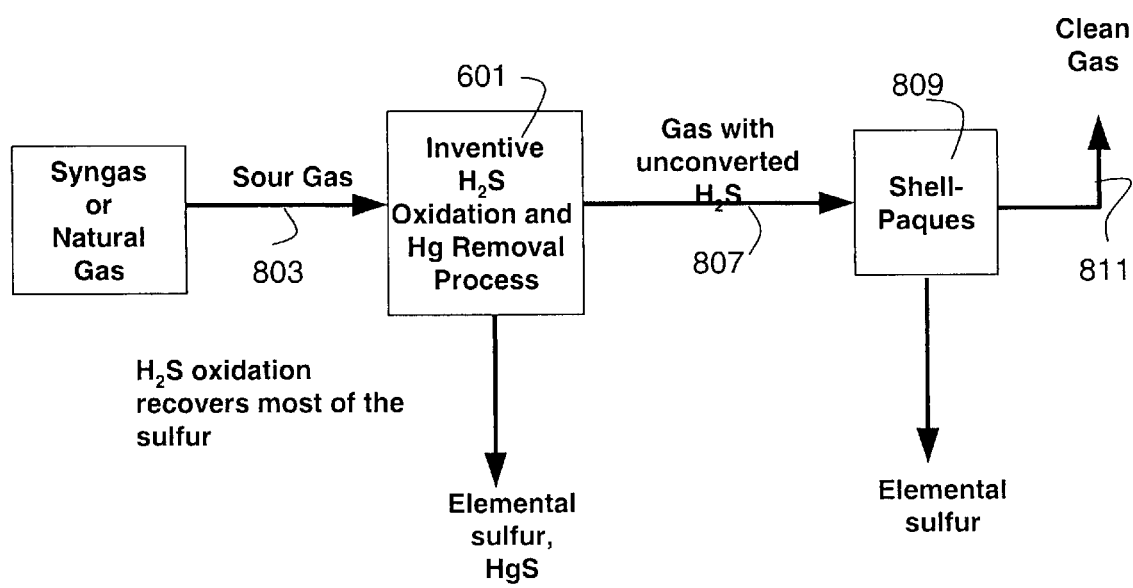
FIG. 5 is a schematic illustration of an exemplary process configuration in which a catalytic reactor of this invention is positioned upstream of a biological sulfur removal process (Shell-Paques process is exemplified) in which sulfide is converted to sulfur for removal. The caustic scrubber in which $H_2S$ is converted to sulfide as a part of the Shell-Paques process is not specifically shown.

FIG. 5 schematically illustrates an exemplary process configuration combining the direct oxidation and Hg removal reaction of this invention with a biological process for conversion of $H_2S$ and/or $SO_2$ to sulfur. The process is illustrated for treatment of natural gas or syngas, but can be applied to other gas streams containing sulfur-containing components. In this configuration, sour gas enters (through inlet 803) the oxidation and Hg removal process (601) and sulfur and mercury generated therein is removed by condensation. Gas exiting the reactor (807) which may contain unreacted $H_2S$, is introduced into the biological sulfur removal process (809) (illustrated by the Shell-Paques process). As illustrated the oxidation reaction is operated to maximize partial oxidation to sulfur for removal. In the biological process, $H_2S$ is converted in a first step to sulfide, e.g. in a caustic reactor, and the sulfide is converted by selected microorganisms (e.g., sulfur bacteria) to sulfur. Cleaned or sweetened gas exits the biological process (811) or may be passed to another processing system.

When undesired levels of $SO_2$ (either $SO_2$ originally present in the gas stream or $SO_2$ generated in the oxidation reactor (601) are present), a different biological process can be employed in which any $SO_2$ present in the gas stream is converted to in a first step to sulfite or sulfate (using for example a sodium bisphosphate solution to absorb $SO_2$. Absorbed sulfite is reduced by the anaerobic action of a microorganism to sulfide and the sulfide generated is oxidized under aerobic conditions in the presence of a microorganism to sulfur.

$H_2S$ Oxidation and Hg Removal Combined With a Split Flow Claus Process

Figure 6:
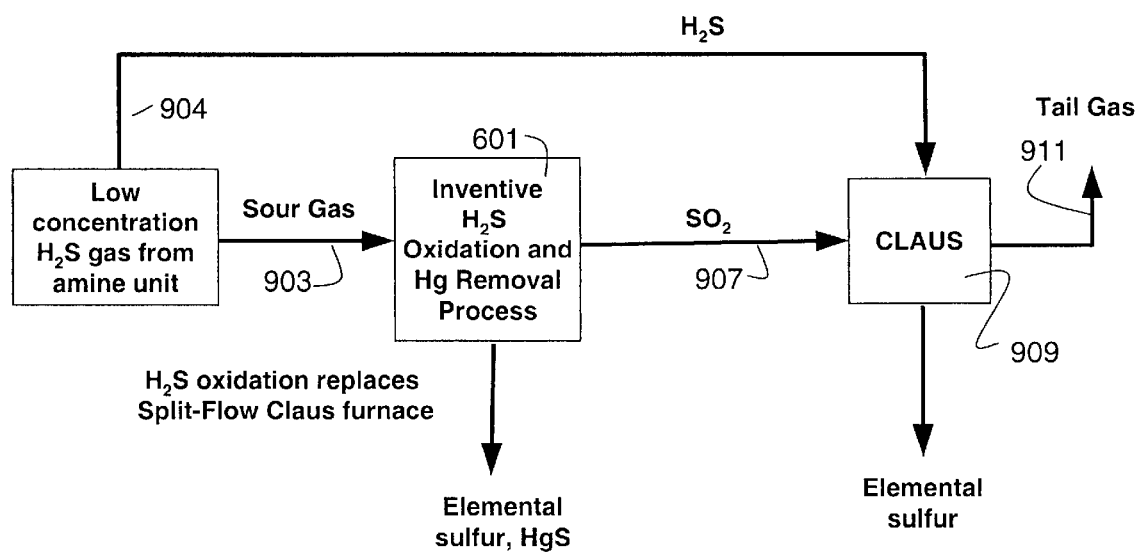
FIG. 6 is a schematic illustration of an exemplary process configuration in which a catalytic reactor of this invention is positioned upstream of a conventional Claus unit (which may be a multi-stage Claus unit). The configuration illustrated is that of a Split-Flow Claus process in which the catalytic process of this invention replaces a furnace or burner (used in the prior art configuration to generated $SO_2$). Claus tail gas is illustrated as exiting the process. Art-known CTGT, such as the SCOT process, can be applied to treat the tail gas.

The inventive catalytic oxidation process can be used to replace the furnace in a split flow Claus plant for processing low concentrations of $H_2S$. The split flow Claus process is typically used for gases containing low concentrations of $H_2S$ and is especially attractive for $H_2S$ concentrations below 12% (Alcoa, 1997). FIG. 6 schematically illustrates a sulfur removal/recovery configuration in which a direct oxidation and Hg removal reactor of this invention (e.g., the reactor of FIG. 1) is positioned upstream of a liquid Claus unit. Sour gas from a source containing a low concentration of $H_2S$ (e.g., 40% or less) is split (904 and 903). A portion of the feed gas stream (904) is directed into the Claus unit (909) and a portion (903) is introduced into the oxidation and Hg removal process (601). By controlling the amount of air added to the catalytic reactor (601) and operating at moderate temperatures (ca<200° C.), $H_2S$ in the split stream (903) can be converted into $SO_2$ and elemental sulfur. Gas exiting the oxidation process (907) containing $SO_2$ is passed to the Claus unit and sulfur generated in the oxidation process is condensed. A third or more of the feed gas flow can be sent through the direct oxidation process. Diversion of feed gas flow decreases the total sulfur load on the Claus converters. After processing through the Claus process, elemental sulfur is recovered and tail gas (911) exits the system. Dependent upon the residual levels of $H_2S$ in the tail gas, it may be recycled through the oxidation process or passed into a second catalytic reactor for additional sulfur generation.

Feed gases with $H_2S$ contents below about 12% can be processed without having to add fuel because the $H_2S$ oxidation into $SO_2$ is catalytic and proceeds at temperatures below 500° C.

Figure 7:
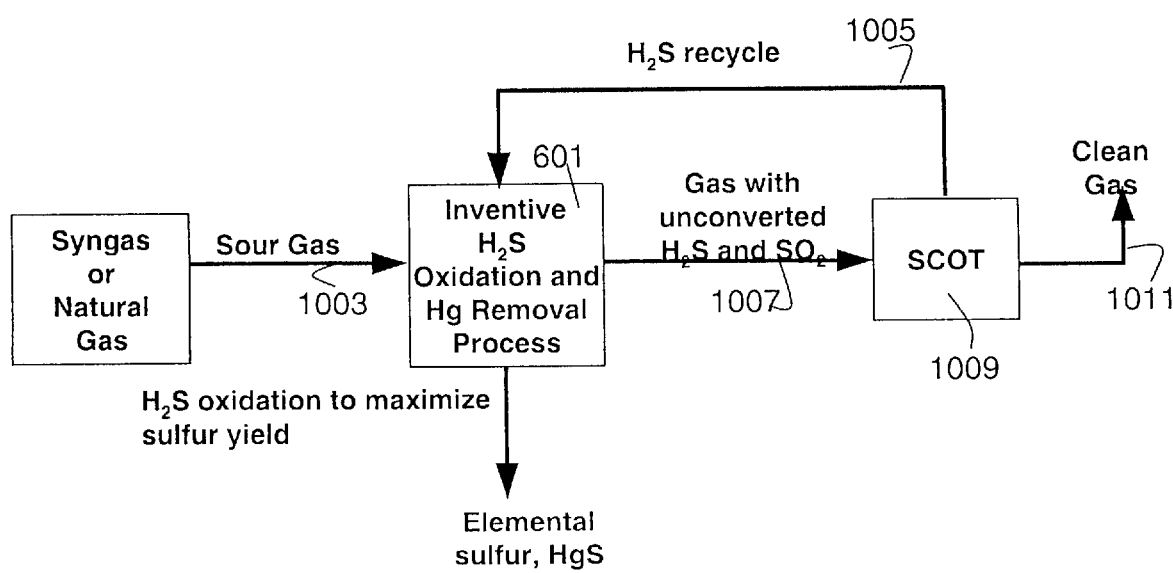
FIG. 7 is a schematic illustration of an exemplary process configuration in which a catalytic reactor of this invention is positioned upstream of a Claus Tail Gas Treatment (CTGT) unit. The unit is exemplified by a SCOT process with recycle.

$H_2S$ Oxidation and Hg Removal Combined with the SCOT (Shell Claus Offgas Treatment) Process FIG. 7 schematically illustrates a sulfur removal/recovery configuration in which a direct oxidation and Hg removal reactor of this invention (e.g., the reactor of FIG. 1) is positioned upstream of tail gas clean-up unit, such as a SCOT unit. The process is illustrated for treatment of natural gas or synthesis gas. A SCOT process, as is known in the art, has two elements: a hydrogenation/hydrolysis unit, followed by a water quench and an amine gas treatment unit. Tail gas from a Claus unit is introduced into the hydrogenation/hydrolysis unit, heated to 250–300° C. and reacted with a reducing gas (e.g., hydrogen or a mixture of hydrogen and CO) employing a cobalt molybdate catalyst. $SO_2$, S, COS, $CS_2$, and other sulfur species in the tail gas are reduced to $H_2S$. The temperature of the processed gas stream is lowered (water-quench to 180° C. and $H_2S$ is selectively absorbed in an amine unit (using an alkanolamine solution, for example). $H_2S$ is stripped from the absorber solution and recycled back to the hydrogenation/hydrolysis unit.

FIG. 7 illustrates sour gas introduced (1003) into the oxidation and Hg removal process (601). Any unconverted $H_2S$ and $SO_2$ generated in the oxidation process (1007) are passed into the SCOT process (1009) and residual $H_2S$ and $H_2S$ generated during hydrogenation/hydrolysis is recycled back (1005) to the oxidation process. Sweetened gas exits (1011) or is passed to another process system.

In the preferred mode of operation for this scheme, the reactor conditions are adjusted to obtain the highest sulfur yield. Since the SCOT process converts all sulfur compounds to $H_2S$ for recycle, generating some $SO_2$ in the direct oxidation reactor does not detrimentally affect the process.

Another scheme used to clean up natural gas, syngas, or refinery fuel gas/hydrogen recycle streams is the combination of direct oxidation with the use of a scavenger system behind it. For small sulfur loads, this combination may be more economical than direct oxidation in combination with liquid sulfur recovery systems discussed above. The scavenger system has low capital costs and the disposable scavengers (e.g. iron-based scavengers) provide excellent economics when gas streams contain small quantities of $H_2S$.

Alternatively the $H_2S$ oxidation process of this invention can be used alone or simply in combination with a hydrogenation/hydrolysis unit to treat Claus tail gas streams.

The processes of this invention are applicable to high-pressure natural gas streams and to the removal of $H_2S$ and Hg from a hydrogen recycle stream or refinery hydrotreaters (see Rueter 2002). The processes are also applicable to removal of $H_2S$ and Hg from low pressure gas stream, e.g., for treatment of refinery fuel gas, gasification streams, synthesis gas and gas streams from $CO_2$ floods. The catalysts and catalytic methods of this invention for oxidation of $H_2S$ have been found to selectively oxidize $H_2S$ in the presence of CO and hydrogen without significant oxidation of CO or hydrogen. As a consequence of this finding, the methods herein can be used directly to treat syngas to remove $H_2S$ and Hg.

More specifically, in the inventive process for desulfurization and Hg removal of gasification products containing CO and hydrogen, a selected amount of oxygen (typically added as air) is added to the gasification product stream and the mixture is contacted with the mixed metal oxide catalyst at temperatures between about 100° C. and about 500° C. preferably between about 160° C. to about 250° C. more preferably between about 170° C. to about 200° C. where $H_2S$ is partially oxidized into elemental sulfur and water or fully oxidized to give $SO_2$. The relative amounts of $H_2S$ and $SO_2$ can be selected by adjustment of the $O_2$ to $H_2S$ ratio in the feed gas for a given catalyst and the temperature. Further, the composition of the catalyst can be chosen and in combination with adjustment of the $O_2$ to $H_2S$ ratio in the feed gas the relative amounts of $H_2S$ and $SO_2$ generated by the direct oxidation process can be controlled.

The preferred space velocity of the reaction is between about 100 and about 10,000 $m^3$ of gas/$m^3$ of catalyst/hour, and the processes can be operated at ambient pressure and at higher pressures up to about 1,000 psig.

In the inventive process, the $H_2S$ is oxidized to elemental sulfur and water (and some $SO_2$) without oxidizing either the CO or $H_2$ substantially. Because the catalyst will oxidize $H_2S$ but not oxidize CO or $H_2$, syngas containing $H_2S$. can be directly treated. A catalyst that oxidizes CO or $H_2$ would be unsuitable in this application.

For $H_2S$ concentrations below about 5%, the oxidation of $H_2S$ into sulfur and water can be done using an adiabatic fixed bed reactor. For concentrations higher than about 5% by volume, internal cooling or multiple stage reactors can be used to remove the exothermic heat of reaction of $H_2S$ oxidation.

By adjusting the amount of air ($O_2$) added to the gas stream, the catalyst temperature and the catalyst composition, the ratio of elemental sulfur to $SO_2$ exiting the catalytic reactor can be adjusted to a selected value. This was demonstrated by the tests with the Cu-promoted catalyst and $O_2/H_2S=1.0$ and $O_2/H_2S=0.7$). This ability to selectively adjust the relative yields of elemental sulfur and $SO_2$ provides a very flexible oxidation process that can be optimized for use as an upstream technology for various sulfur recovery processes, including liquid-redox processes, conventional Claus processes and liquid phase Claus processes.

The following examples further illustrate the invention, but are in no way intended to unduly limit the invention.

EXAMPLES

Example 1

Equilibrium Calculations

A typical composition of syngas is shown in Table 3. For high sulfur coal, the $H_2S$ concentration was assumed to be 10,000 ppm. For low sulfur coal, the $H_2S$ concentration was assume to be 100 ppm This composition was assumed for all the equilibrium and economic analyses in this section. The pressure was assumed to be 30 atmospheres. The syngas enters the direct oxidation and mercury removal reactor. The hydrogen sulfide is oxidized to sulfur and water (>90% conversion of $H_2S$ to S). The molar composition of the gas stream at the direct oxidation reactor outlet is shown in Table 4. The sulfur that is formed in the reactor is then cooled to between 120–140° C. in a sulfur condenser, where the sulfur vapors are condensed into molten sulfur. The molten sulfur drains out of the sulfur condenser and is collected for disposal.

Figure 8:
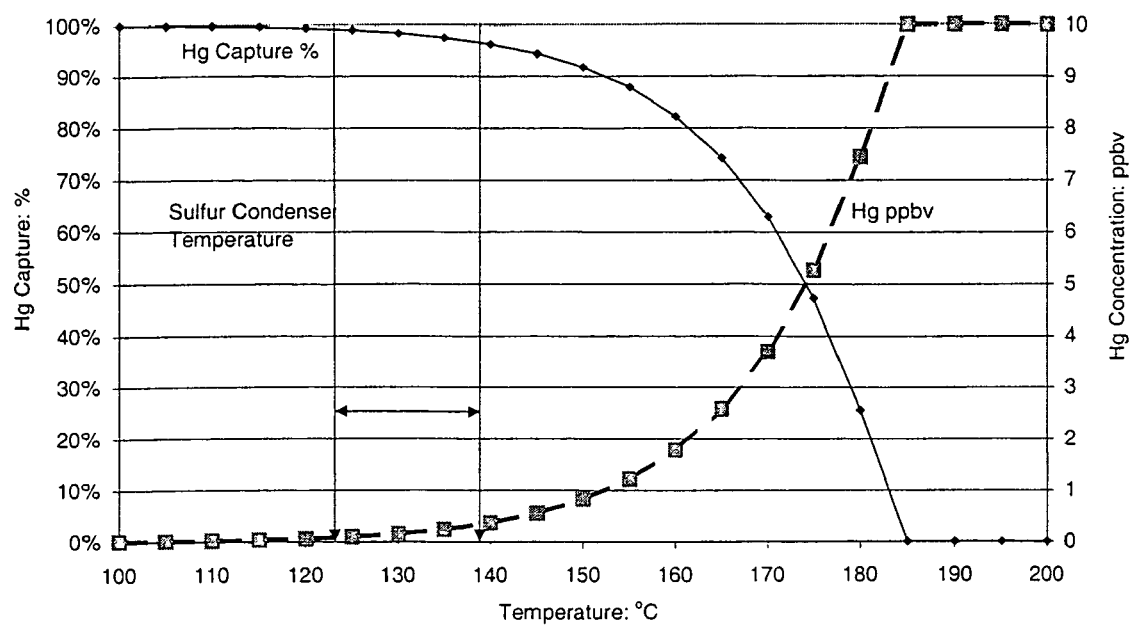
FIG. 8 illustrates Hg removal efficiency and Hg concentration in the sulfur condenser for high sulfur coal (10,000 ppm $H_2S$ in syngas).
Figure 9:
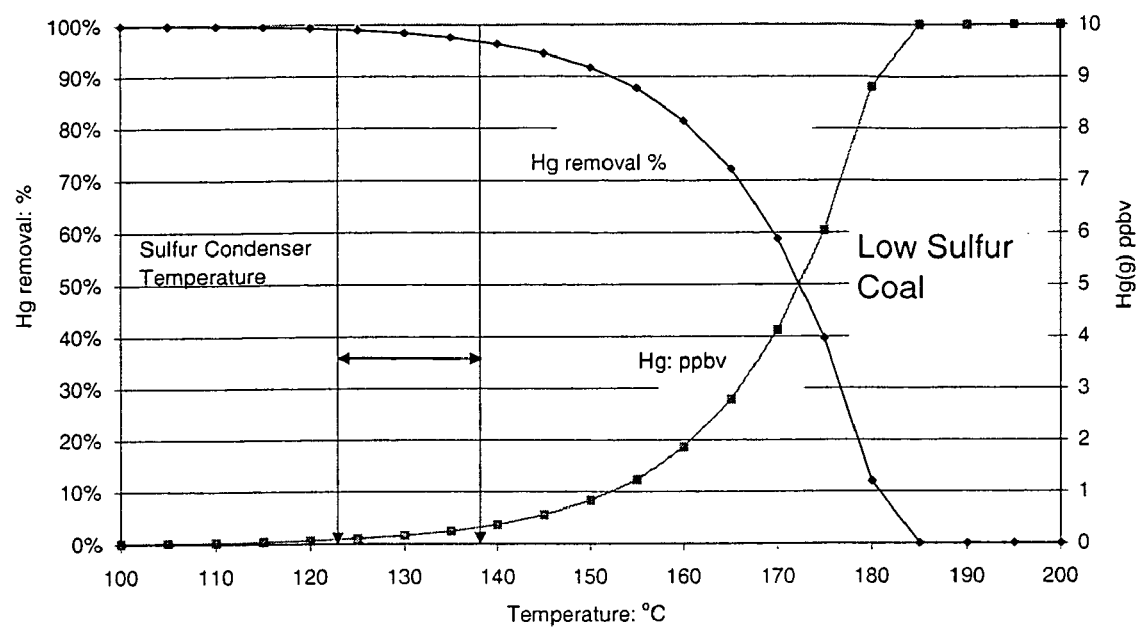
FIG. 9 illustrates Hg removal efficiency and Hg concentration in the sulfur condenser for low sulfur coal (100 ppm $H_2S$ in syngas).

FIG. 8 and FIG. 9 show the mercury removal efficiency and the resultant mercury concentration at the sulfur condenser outlet for both high sulfur (FIG. 8) and low sulfur (FIG. 9) coal as a function of temperature. The removal efficiency and effluent mercury concentration were calculated using HSC Chemistry, a commercially available thermodynamic calculation package (Outokumpu Research Oy, Fn-28101 PORI, Finland). In the temperature range of interest (about 120–about 140° C.), where the sulfur condenser operates, more than 98% removal of Hg can be achieved with the resultant Hg concentration being less than or equal to about 0.5 ppb.

TABLE 4

| Gases | % |
| --- | --- |
| $N_2$ (g) | 1.753 |
| Ar (g) | 0 |
| $CO_2$ (g) | 14.576 |
| CO (g) | 41.79 |
| $H_2$ (g) | 31.734 |
| Hg (g) | 0 |
| $H_2O$ (g) | 9.225 |
| S (g) | 0.923 |
| $S_2$ (g) | 0 |
| $S_3$ (g) | 0 |
| $S_4$ (g) | 0 |
| $S_5$ (g) | 0 |
| $S_6$ (g) | 0 |
| $S_7$ (g) | 0 |
| $S_8$ (g) | 0 |

Example 2

Economics

An economic analysis of the Hg removal in the gasified stream has been undertaken. For high sulfur coal, 10,000 ppm $H_2S$ was used as the basis concentration in the gas. For low sulfur coal, 800 ppm was used $H_2S$ in the gas. For the high sulfur coal, assuming that all the sulfur is land filled (at an expense of $25/ton) and adding an opportunity cost of $35/ton (for not being able to use the sulfur), we arrive at a cost of $4795/lb of mercury disposed. For the low sulfur coal, with the same assumptions, we arrive at a cost of $384/lb of mercury.

In the second case, we assumed that, instead of land filling the sulfur, we will be distilling the sulfur so that, the mercury and sulfur are separated. Using this method, we have assumed that 90% of the sulfur will be free of Hg and will be available for sale. The remaining 10% of the sulfur which will be combined with the mercury will need to be land filled. In addition, we have calculated a capital cost of $20/ton sulfur for the still. Heating costs for distillation have also been calculated and added to the overall cost of mercury removal. Using this approach, we arrive at $1853/lb Hg. This is by far the best option for processing high sulfur coal.

Example 3

Sulfur Dew Point

To avoid bed fouling or equipment plugging, it is preferred to operate a catalytic reactor of this invention in a pressure and temperature regime where any elemental sulfur formed in the reaction will remain in the vapor phase. The experiments reported show that for the best catalysts, the preferred operating temperature was 250° C. The dew point pressure for elemental sulfur at 250° C. determines the maximum concentration of sulfur vapor that can be present over the catalyst. This is linked to the maximum allowable $H_2S$ concentration via the selectivities to $SO_2$ and sulfur. Higher selectivities to $SO_2$ permit the processing gases with higher $H_2S$ concentrations.

An example of how the maximum allowable $H_2S$ concentration is calculated is discussed below. Sulfur vapor-liquid-equilibrium (VLE) calculations can be readily performed for different temperatures and concentrations of sulfur vapor. At T=250° C. for 2000 ppm of elemental sulfur vapor condensation starts at a pressure of 72 bar (1044 psi). For the TDA#2 (5% $Fe_2O_3$/0.5% $MoO_3$/5% $Nb_2O_5$/$TiO_2$) catalyst the best conditions observed were $O_2$/$H_2S$=1.5 and T=250° C. Under these conditions the selectivity for sulfur was 30% and the selectivity for $SO_2$ was 70%. Assuming that the pressure affects the sulfur dew point more than the kinetics of the catalytic reaction, then the maximum concentration of $H_2S$ that could be present in the reactor feed would be 6666 ppm for these values of S and $SO_2$ catalyst selectivity. These pressures (72 bar) and concentrations (6000+ ppm) are somewhat approximate because the calculations do not include corrections for non-ideal gas behavior; however, the calculations do indicate that natural gas streams containing a fairly wide range of $H_2S$ concentrations at pressures of interest (i.e., pressure up to 1000 psi) can be processed in using catalysts of this invention.

Those of ordinary skill in the art will appreciate that methods and known in the art and can be applied or readily adapted to the practice of this invention without resort to undue experimentation. For example, methods for synthesis of mixed metal oxides other than those specifically exemplified are known in the art and can be applied to the preparation of catalysts. All art-known equivalents of materials, methods specifically exemplified herein are intended to be encompassed by this invention. All references cited herein are incorporated by reference.

REFERENCES

Alcoa (1997) "Look at Claus Unit Design," Alcoa Technical Bulletin 6030-R010797.

Butt, J. B. and Petersen, E. E.(1988) Activation, Deactivation and Poisoning of Catalysts, Academic Press, p. 83

Crevier, P. P., Dowling, N. I., Clark, P. D. and Huang, M. (2001) "Quantifying the Effect of Individual Aromatic Contaminants on Claus Catalyst," *Proceedings, 51st Annual Laurance Reid Gas Conditioning Conference*, University of Oklahoma, February 2001.

Fenderson, S. (1988), "Improving Claus Sulfur Recovery Unit Reliability through Engineering Design," *Brimstone Engineering Sulfur Recovery Symposium*, Sep. 15–18, 1998.

Fisher, K. S., J. E. Lundeen, D. Leppin (1999) "Fundamentals of $H_2S$ Scavenging for Treatment of Natural Gas," Ninth GRI Sulfur Recovery Conference 24–27 Oct. 1999, San Antonio Tex.

"Gas Processes 2002" in *Hydrocarbon Processing*, May 2002, pp. 107–121.

Goar, B. G., and Sames, J. A., (1983). "Tail Gas Clean-up Processes—A Review," *Proceedings: Gas Conditioning Conference* 1983, March, p. E-13.

Hardison, L. C. and Ramshaw, D. E. "$H_2S$ to S: Process Improvements," Hydrocarbon Processing, Vol. 71, January 1992, pp. 89–90.

Janssen, A. J. H. et al. (2001) "Biological Process for $H_2S$ Removal from High-Pressure Gas: the Shell-Paque/THIOPAQ Gas Desulfurization Process," *Sulphur*.

Kohl, A. and Nielsen, R. (1997) *Gas Purification*, 5th ed., Gulf Publishing Company.

Marshneva, V. I., and V. V. Mokrinskii (1989). "Catalytic Activity of Metal Oxides in Hydrogen Sulfide Oxidation by Oxygen and Sulfur Dioxide," *Kinetics and Catalysis*, 29(4), pp. 989–993.

McIntush, K. E.; Petrinec, B. J.; Beitler, C. A. M. (2000) "Results of Pilot Testing the CrystaSulf$^{SM}$ Process," *Proceedings of the 50th Laurance Reid Gas Conditioning Conference*, Feb. 27–Mar. 1, 2000, Norman O K.

McIntush, K. E. C. O. Rueter and K. E. De Berry (2001) "Comparison of Technologies for Removing Sulfure for High-Pressure Sour Natural Gas with Sulfur Throughputs between). 1 and 30 Long Tons/Day," *Proc. 80TH Annual GPA Convention*.

Mirzoev, I. M (1991) "Oxidation of Hydrogen Sulfide on a Multicomponent Iron-Containing Catalyst. *Journal of applied chemistry of the USSR*. FEB 01 v 64 n 2 p 1, p. 238.

Nagl, G. J. (1991) "The State of Liquid Redox" Proceedings of the Ninth Gas Research Institute Sulfur Recovery Conference, Gas Research Institute Chicago, Ill.

Nagl, G. J. (2001) "Employing Liquid Redox as a tail Gas Cleanup Unit" 2001 NPRA Environmental Conference Sep. 23–25, 2001, Austin Tex., National Petrochemical and Refiners Association, Washington, D.C.

Nivak, M. and Zdrazil, M. (1991) "Oxidation of Hydrogen Sulfide over $Fe_2O_3/Al_2O_3$ Catalyst: Influence of Support Texture and $Fe_2O_3$ Precursor". *Collection of Czechoslovak Chemical Communication* Sep. 1, v 56 n 9, p. 1893.

Olah, G. A. and Molnar, A. (1995) *Hydrocarbon Chemistry*, Wiley.

Oostwouder, S. P. (1997) "SulFerox Process Update," *Proc. GRI Sulfur Recovery Conf. 8th Meeting*, 1997.

Pacific Environmental Services (1996) Background Report AP-42 Section 5.18 "Sulfur Recovery" Prepared for the United States Environmental Agency OAQPS/TSD/EIB available from the US EPA (Pacific Environmental Services, Inc. P.O. Box 12077 Research Triangle Park, NC 27709).

Smit, C. J. and E. C. Heyman (1999) "Present Status SulFerox Process." *Proc. GRI Sulfur Recovery Conf 9th Meeting*, 1999.

Stocchi, E. (1990) *Industrial Chemistry*, Ellis Norwood, p. 203.

We claim:

1. A method for simultaneous removal of hydrogen sulfide or other sulfur-containing compounds and mercury from a gas stream which comprises the steps of:
   a. contacting the gas stream containing hydrogen sulfide or other sulfur-containing compounds and mercury with a mixed metal oxide catalyst at a temperature equal to or less than about 400° C. in the presence of oxygen such that a substantial amount of the hydrogen sulfide or other sulfur-containing compounds present in the gas stream is oxidized to sulfur; and
   b. condensing the sulfur out of the gas stream whereby mercuric sulfide formed by interaction of the sulfur generated with mercury in the gas stream is also condensed with the sulfur,
   wherein the mixed metal oxide catalyst comprises a low oxidation activity metal oxide selected from the group consisting of titania, silica, zirconia, alumina and mixtures thereof and one or more higher oxidation activity metal oxides.

2. The method of claim 1 wherein the low oxidation activity metal oxide is titania, silica, alumina or mixtures thereof.

3. The method of claim 1 wherein the gas stream comprises hydrocarbons, oxygenated hydrocarbons, sulfur-containing hydrocarbons, aromatic hydrocarbons, aliphatic hydrocarbons, hydrogen, carbon monoxide or mixtures thereof.

4. The method of claim 1 wherein the gas stream comprises hydrogen, carbon monoxide or mixtures thereof.

5. The method of claim 1 wherein the gas stream comprises hydrocarbons.

6. The method of claim 1 wherein the gas stream comprises methane.

7. The method of claim 1 wherein the gas stream is a natural gas stream or a synthesis gas stream.

8. The method of claim 1 wherein the gas stream comprises aromatic hydrocarbons.

9. The method of claim 1 wherein the temperature at which the catalyst is contacted with the gas stream in the presence of oxygen is less than 400° C.

10. The method of claim 9 wherein the temperature is between about 160° C. and about 250° C.

11. The method of claim 9 wherein the temperature is between about 170° C. and about 200° C.

12. The method of claim 1 wherein 85% by volume or more of the hydrogen sulfide or other sulfur-containing compounds in the gas stream is converted to sulfur, or a mixture of sulfur and sulfur dioxide.

13. The method of claim 1 wherein the hydrogen sulfide in the gas stream is converted substantially to sulfur.

14. The method of claim 1 wherein the low oxidation activity metal oxide is titania or a mixture of titania with silica.

15. The method of claim 1 wherein the low oxidation activity metal oxide is titania.

16. The method of claim 1 wherein the low oxidation activity metal oxide is an alumina.

17. The method of claim 16 wherein the alumina is alpha alumina or gamma alumina.

18. The method of claim 1 wherein the low oxidation activity metal oxide is selected from the group consisting of titania, silica, alumina and mixtures thereof and the higher activity metal oxide is an oxide of a metal selected from the group consisting of V, Cr, Mn, Fe, Co, Ni, Cu, Nb, Mo, Tc, Ru, Rh, Hf, Ta, W, Au, La, Ce, Pr, Nd, Pm, Eu, Gd, Tb, Dy, Ho, Er, Tm, Yb, Lu and mixtures thereof.

19. The method of claim 18 wherein the higher oxidation activity metal oxide is an oxide of a metal selected from the group consisting of Fe, Co, Mn, Cr, Cu, Mo, Nb, and mixtures thereof.

20. The method of claim 18 wherein the higher oxidation activity metal oxide is a metal oxide of a transition metal or a mixture of transition metals.

21. The method of claim 18 wherein the mixed metal oxide catalyst comprises one or more metal oxides of lanthanide metals.

22. The method of claim 1 wherein the mixed metal oxide catalyst comprises titania, silica, alumina or mixtures thereof in combination with one or more metal oxides of a metal selected from the group consisting of Fe, Co, Mn, Cr, Cu, Mo, Nb and mixtures thereof.

23. The method of claim 1 wherein the mixed metal oxide catalyst comprises titania, silica, alumina or mixtures thereof in combination with two or more metal oxides of a metal selected from the group consisting of Fe, Co, Mn, Cr, Cu, Mo and Nb.

24. The method of claim 1 wherein the mixed metal oxide catalyst comprises titania, silica, alumina, or mixtures thereof in combination with three or more metal oxides of a metal selected from the group consisting of Fe, Co, Mn, Cr, Cu, Mo and Nb.

25. The method of claim 1 wherein the mixed metal oxide catalyst comprises titania, silica, alumina or mixtures thereof in combination with a metal oxide of Mo, Nb or both and in combination with a metal oxide of a metal selected from the group consisting of Fe, Co, Mn, Cr, and Cu.

26. The method of claim 1 wherein the mixed metal oxide catalyst comprises titania, an oxide of Mo, an oxide of Nb and an oxide of one or more metals selected from the group consisting of Fe, Co, Cr, Mn and Cu.

27. The method of claim 1 wherein the metal oxide catalyst comprises titania, an oxide of Mo, an oxide of Nb and an oxide of Cu or Fe.

28. The method of claim 1 wherein titania or a combination of titania and silica is present at a level of 50% by weight or more in the catalyst.

29. The method of claim 28 wherein titania or a combination of titania and silica is present at a level of 75% by weight or more in the catalyst.

30. The method of claim 1 wherein the metal oxide catalyst contains from about 0.1% to about 10% by weight of each of one, two, three or four metal oxides wherein the metal oxide is a metal oxide of a metal is selected from the group consisting of Fe, Co, Mn, Cr, Cu, Mo and Nb.

31. The method of claim 1 wherein the metal oxide catalyst contains from 0.1% to about 10% by weight of an oxide of Mo, an oxide of Nb or both and contains from about 1% to about 10% by weight of an oxide of Fe, Cu or Co.

32. The method of claim 1 wherein the catalyst comprises about 1 to about 10% by weight copper oxide, about 1 to about 10% by weight niobium oxide, and about 0.1 to about 1% by weight molybdenum oxide with the remainder being titania or a mixture of titania and silica.

33. The method of claim 1 wherein the catalyst comprises about 1 to about 10% by weight iron oxide, about 1 to about 10% by weight niobium oxide, and about 0.1 to about 1% by weight molybdenum oxide with the remainder being titania or a mixture of titania and silica.

34. The method of claim 1 wherein the catalyst comprises about 1 to about 10% by weight cobalt oxide, about 1 to about 10% by weight niobium oxide, and about 0.1 to about 1% by weight molybdenum oxide with the remainder being titania or a mixture of titania and silica.

35. The method of claim 1 wherein the mixed metal oxide catalyst comprises about 0.4 to about 0.6% by weight molybdenum oxide, about 4 to about 6% by weight niobium oxide, and about 4 to about 6% by weight of copper oxide, cobalt oxide, iron oxide, or a mixture thereof with the remainder being titania or a mixture of titania and silica.

36. The method of claim 1 wherein the mixed metal oxide catalyst comprises up to about 10% by weight of a binder.

37. The method of claim 36 wherein the binder is silica.

38. The method of claim 1 wherein the mixed metal oxide catalyst comprises titania in combination with one or more mixed metal oxides of a metal selected from the group consisting of Fe, Cu, Co, Mo, Nb, Mn and Cr and wherein the temperature at which step a is conducted ranges between about 160° C. to about 250° C.

39. The method of claim 1 wherein the catalyst is co-formed.

40. The method of claim 1 wherein the catalyst is formed into pellets or is extruded.

41. The method of claim 1 wherein the catalyst has a surface area ranging from about 50 to about 150 m$^2$/g.

42. The method of claim 1 wherein the catalyst is sulfated on contact with hydrogen sulfide, sulfur dioxide or sulfur.

43. The method of claim 1 wherein the catalyst is prepared by calcining a mixed metal oxide powder at a temperature of about 300° C. to 550° C.

44. The method of claim 1 wherein the catalyst is prepared by calcining a mixed metal oxide powder at a temperature of about 400° C. to 450° C.

45. The method of claim 1 further comprising the step of adding hydrogen sulfide to the gas stream prior to contacting the gas stream with the mixed metal oxide catalyst wherein the amount of hydrogen sulfide added to the gas stream is sufficient to generate a hydrogen sulfide concentration in the gas stream such that sulfur is generated on oxidation.

46. The method of claim 1 further comprising the steps of:
optionally returning the product gas stream from which sulfur and mercury have been condensed to step a to generate additional sulfur, or a mixture of sulfur and sulfur dioxide and repeating step b and c until the undesired mercury, hydrogen sulfide or both are removed from the gas stream.

47. The method of claim 1 where in step a the temperature of operation, catalyst and the $O_2/H_2S$ ratio in the feed gas stream are selected to generate a product gas stream in which sulfur generated by $H_2S$ oxidation is maximized and $SO_2$ generated by $H_2S$ oxidation is minimized.

48. The method of claim 47 which further comprises the step, after condensation of sulfur and mercuric sulfide, of treating the gas stream with a liquid redox process for removal of remaining undesired $H_2S$.

49. The method of claim 47 which further comprises the step, after condensation of sulfur and mercuric sulfide, of treating the gas stream with a biological sulfur removal process for removal of remaining undesired $H_2S$.

50. The method of claim 47 which further comprises the step, after condensation of sulfur and mercuric sulfide, of treating the gas stream with a scavenger process for removal of remaining $H_2S$.

51. The process of claim 47 which further comprises the step, after condensation of sulfur and mercuric sulfide, of treating the gas stream with an amine separation unit to separate $H_2S$, $SO_2$ or both from the product gas to generate a feed gas stream containing $H_2S$, $SO_2$ or both which is thereafter returned to step a.

52. The process of claim 47 wherein the gas stream is a natural gas stream or a synthesis gas stream containing $H_2S$ and mercury.

53. The process of claim 1 wherein the gas stream contains from about 1 ppb to about 1 ppm mercury.

* * * * *